United States Patent
Kim et al.

(10) Patent No.: US 12,396,051 B2
(45) Date of Patent: Aug. 19, 2025

(54) METHOD AND APPARATUS FOR FAILURE RECOVERY IN WIRELESS COMMUNICATION SYSTEM

(71) Applicant: LG Electronics Inc., Seoul (KR)

(72) Inventors: Hongsuk Kim, Seoul (KR); Sunghoon Jung, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 17/624,026

(22) PCT Filed: Mar. 2, 2021

(86) PCT No.: PCT/KR2021/002531
§ 371 (c)(1),
(2) Date: Dec. 30, 2021

(87) PCT Pub. No.: WO2021/172964
PCT Pub. Date: Sep. 2, 2021

(65) Prior Publication Data
US 2023/0262540 A1    Aug. 17, 2023

Related U.S. Application Data

(60) Provisional application No. 62/982,613, filed on Feb. 27, 2020.

(51) Int. Cl.
*H04W 76/19* (2018.01)
*H04W 36/00* (2009.01)
(Continued)

(52) U.S. Cl.
CPC ....... *H04W 76/19* (2018.02); *H04W 36/0079* (2018.08); *H04W 36/305* (2018.08);
(Continued)

(58) Field of Classification Search
CPC .......... H04W 36/00698; H04W 76/19; H04W 36/0079; H04W 36/305; H04W 36/362; H04W 36/00695; H04W 36/0069
See application file for complete search history.

(56) References Cited

U.S. PATENT DOCUMENTS

| 2021/0168678 A1* | 6/2021 | Deenoo | H04W 76/19 |
| 2022/0014985 A1* | 1/2022 | Da Silva | H04W 36/00838 |

FOREIGN PATENT DOCUMENTS

| CN | 110169113 | 8/2019 |
| CN | 110622548 | 12/2019 |

(Continued)

OTHER PUBLICATIONS

3GPP, "3rd Generation Partnership Project; Technical Specification Group Radio Access Network; NR; Radio Resource Control (RRC) protocol specification (Release 15)," TS 38.331 V15.8.0, Dec. 2019.

(Continued)

*Primary Examiner* — Faruk Hamza
*Assistant Examiner* — Alan L Lindenbaum
(74) *Attorney, Agent, or Firm* — Fish & Richardson P.C.

(57) ABSTRACT

The present disclosure relates to a failure recovery in wireless communications. According to an embodiment of the present disclosure, a method performed by a wireless device served by a master node (MN) and a secondary node (SN) in a dual connectivity (DC) in a wireless communication system comprises: receiving information for a timer related to a fast master cell group (MCG) recovery and a conditional mobility attempt configuration; starting the timer related to the fast MCG recovery upon detecting a MCG failure; and based on detecting an expiry of the timer related to the fast MCG recovery: removing one or more conditional mobility (Continued)

commands stored in the wireless device; and initiating a transmission of a radio resource control (RRC) re-establishment request message.

11 Claims, 19 Drawing Sheets

(51) Int. Cl.
    *H04W 36/30*     (2009.01)
    *H04W 36/36*     (2009.01)
(52) U.S. Cl.
    CPC .... *H04W 36/362* (2023.05); *H04W 36/00695* (2023.05); *H04W 36/00698* (2023.05)

(56) References Cited

FOREIGN PATENT DOCUMENTS

| | | |
|---|---|---|
| CN | 110708766 | 1/2020 |
| WO | WO2018182231 | 10/2018 |
| WO | WO 2019195060 | 10/2019 |
| WO | WO 2020/011157 | 1/2020 |

OTHER PUBLICATIONS

Intel Corporation, "Introduction of NR mobility," Change Request R2-2000463, Presented at 3GPP TSG-RAN WG2 Meeting #109 electronic, Elbonia, Feb. 24-Mar. 6, 2020, 521 pages.

LG Electronics Inc., "Conditional handover procedure," R2-1801425 (Resubmission of R2-1713820), Presented at 3GPP TSG-RAN2 NR AH#3, Vancouver, Canada, Jan. 22-26, 2018, 3 pages.

Nokia & Nokia Shanghai Bell, "Failure Handling via CHO recovery," R2-1915499, Presented at 3GPP TSG-RAN WG2 Meeting #108, Reno, USA, Nov. 18-22, 2019, 8 pages.

Nokia & Nokia Shanghai Bell, "Summary of 6.9.3.2 Conditional Handover Failure Handling," R2- 2002016, Presented at 3GPP TSG-RAN WG2 Meeting #109e, Elbonia, Online, Feb. 24-Mar. 6, 2020, 3 pages.

Qualcomm Incorporated, "Remaining issues on conditional intra-SN PSCell change without MN involvement failure handling," R2-2001150, Presented at 3GPP TSG-RAN WG2 Meeting #109 Electronic, Feb. 24-Mar. 6, 2020, 5 pages.

Samsung, "Remaining issues concerning conditional change (mostly PSCell)," R2-2001163, Presented at 3GPP TSG-RAN WG2#109e meeting, Online, Greece, Feb. 24-Mar. 4, 2020, 23 pages.

ZTE Corporation & Sanechips, "Discussion on fast RLF recovery when applying CHO and fast MCG recovery," R2-1913484, Presented at 3GPP TSG RAN WG2 Meeting #107bis, Chongqing, China, Oct. 14-18, 2019, 3 pages.

ZTE Corporation & Sanechips, "Discussion on fast RLF recovery when applying CHO and fast MCG recovery," R2-2001260, revision of R2-1914814, Presented at 3GPP TSG RAN WG2 Meeting #109e, Online, Feb. 24-Mar. 6, 2020, 4 pages.

Ericsson, "[108#28][R16 RRC] 38331 Rel-16 CR Merge," 3GPP TSG-RAN WG2 Meeting #109e, R2-2001086, Elbonia, Feb. 24-Mar. 6, 2020, 794 pages.

Extended European Search Report in European Application No. 21760611.0, dated Dec. 20, 2022, 10 pages.

Notice of Allowance in Chinese Appln. No. 202180007498.2, mailed on Jun. 15, 2023, 10 pages (with English translation).

Office Action in Japanese Appln. No. 2022-542311, mailed on Sep. 19, 2023, 4 pages (with English translation).

Vivo, Ericsson, "Running CR to 37.340 for CA/DC enhancements," 3GPP TSG-RAN2 Meeting #108, R2-1916642, Reno, Nevada, USA, Nov. 18-22, 2019, 15 pages.

Ericsson, "Summary of email discussion [107#31][NR/DCCA] MCG fast recovery," R2-1913296, 3GPP TSG-RAN WG2 #107bis, Chongqing, China, Oct. 14-18, 2019, 34 pages.

LG Electronics, "Minimal service interruption with mutiple BH RLF notification types," R2-1911478, 3GPP TSG-RAN WG2 Meeting #107, Prague, Czeck, Aug. 26-30, 2019, 4 pages.

LG Electronics, "Resolving open issues on BH RLF," R2-1913803, 3GPP TSG-RAN WG2 Meeting #107bis, Chongqing, China, Aug. 14-18, 2019, 6 pages.

Notice of Allowance in Korean Appln. No. 10-2022-7015832, mailed on Apr. 8, 2025, 11 pages (with English translation).

\* cited by examiner

METHOD AND APPARATUS FOR FAILURE RECOVERY IN WIRELESS COMMUNICATION SYSTEM

CROSS-REFERENCE TO RELATED APPLICATIONS

This application is a National Stage application under 35 U.S.C. § 371 of International Application No. PCT/KR2021/002531, filed on Mar. 2, 2021, which claims the benefit of U.S. Provisional Application No. 62/982,613, filed on Feb. 27, 2020. The disclosures of the prior applications are incorporated by reference in their entirety.

BACKGROUND OF THE DISCLOSURE

Field of the Disclosure

The present disclosure relates to a failure recovery in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

There exist various failure recovery mechanisms in wireless communications. The various failure recovery mechanisms may comprise a fast MCG recovery, and conditional mobility failure handling. If the fast MCG recovery is configured, the UE may trigger an MCG fast recovery procedure in which a MCG failure information message is transmitted to the network via SCG, upon detecting a PCell failure. If the conditional mobility failure handling is configured, the UE may attempt conditional mobility execution to a cell selected in an RRC re-establishment procedure when/if the selected cell is a candidate cell for a conditional mobility.

SUMMARY OF THE DISCLOSURE

Technical Problem

An aspect of the present disclosure is to provide method and apparatus for a failure recovery in a wireless communication system.

Another aspect of the present disclosure is to provide method and apparatus for a failure recovery when MCG RLF occurs in a wireless communication system.

Another aspect of the present disclosure is to provide method and apparatus for a failure recovery when the fast MCG recovery and conditional mobility failure handling are configured in a wireless communication system.

Technical Solution

According to an embodiment of the present disclosure, a method performed by a wireless device served by a master node (MN) and a secondary node (SN) in a dual connectivity (DC) in a wireless communication system comprises: receiving information for a timer related to a fast master cell group (MCG) recovery and a conditional mobility attempt configuration; starting the timer related to the fast MCG recovery upon detecting a MCG failure; and based on detecting an expiry of the timer related to the fast MCG recovery: removing one or more conditional mobility commands stored in the wireless device; and initiating a transmission of a radio resource control (RRC) re-establishment request message.

According to an embodiment of the present disclosure, a wireless device in a wireless communication system comprises a transceiver; a memory; and at least one processor operatively coupled to the transceiver and the memory, and configured to: control the transceiver to receive information for a timer related to a fast master cell group (MCG) recovery and a conditional mobility attempt configuration; start the timer related to the fast MCG recovery upon detecting a MCG failure; and based on detecting an expiry of the timer related to the fast MCG recovery: remove one or more conditional mobility commands stored in the wireless device; and initiate a transmission of a radio resource control (RRC) re-establishment request message.

According to an embodiment of the present disclosure, a processor for a wireless device in a wireless communication system is configured to control the wireless device to perform operations comprising: receiving information for a timer related to a fast master cell group (MCG) recovery and a conditional mobility attempt configuration; starting the timer related to the fast MCG recovery upon detecting a MCG failure; and based on detecting an expiry of the timer related to the fast MCG recovery: removing one or more conditional mobility commands stored in the wireless device; and initiating a transmission of a radio resource control (RRC) re-establishment request message.

According to an embodiment of the present disclosure, a computer-readable medium having recorded thereon a program for performing each step of a method on a computer is provided. The method comprises: receiving information for a timer related to a fast master cell group (MCG) recovery and a conditional mobility attempt configuration; starting the timer related to the fast MCG recovery upon detecting a MCG failure; and based on detecting an expiry of the timer related to the fast MCG recovery: removing one or more conditional mobility commands stored in the wireless device; and initiating a transmission of a radio resource control (RRC) re-establishment request message.

According to an embodiment of the present disclosure, a method performed by a base station (BS) in a wireless communication system comprises: transmitting, to the wireless device, information for a timer related to a fast master cell group (MCG) recovery; and receiving, from the wireless device, a radio resource control (RRC) re-establishment request message based on that the wireless device detects detecting an expiry of the timer related to the fast MCG recovery and removes one or more conditional mobility commands stored in the wireless device, wherein the timer related to the fast MCG recovery is started upon the wireless device detecting a MCG failure.

According to an embodiment of the present disclosure, a base station (BS) in a wireless communication system comprises: a transceiver; a memory; and at least one processor operatively coupled to the transceiver and the memory, and configured to control the transceiver to: transmit, to the wireless device, information for a timer related to a fast master cell group (MCG) recovery; and receive, from the wireless device, a radio resource control (RRC) re-establishment request message based on that the wireless device detects detecting an expiry of the timer related to the fast MCG recovery and removes one or more conditional mobility commands stored in the wireless device, wherein the timer related to the fast MCG recovery is started upon the wireless device detecting a MCG failure.

Advantageous Effect

The present disclosure can have various advantageous effects.

For example, unnecessary multiple recovery procedures can be prevented when the UE detects radio link failure. Therefore, the UE may not suffer the potential data interruption problem which may be caused by multiple recovery procedures.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
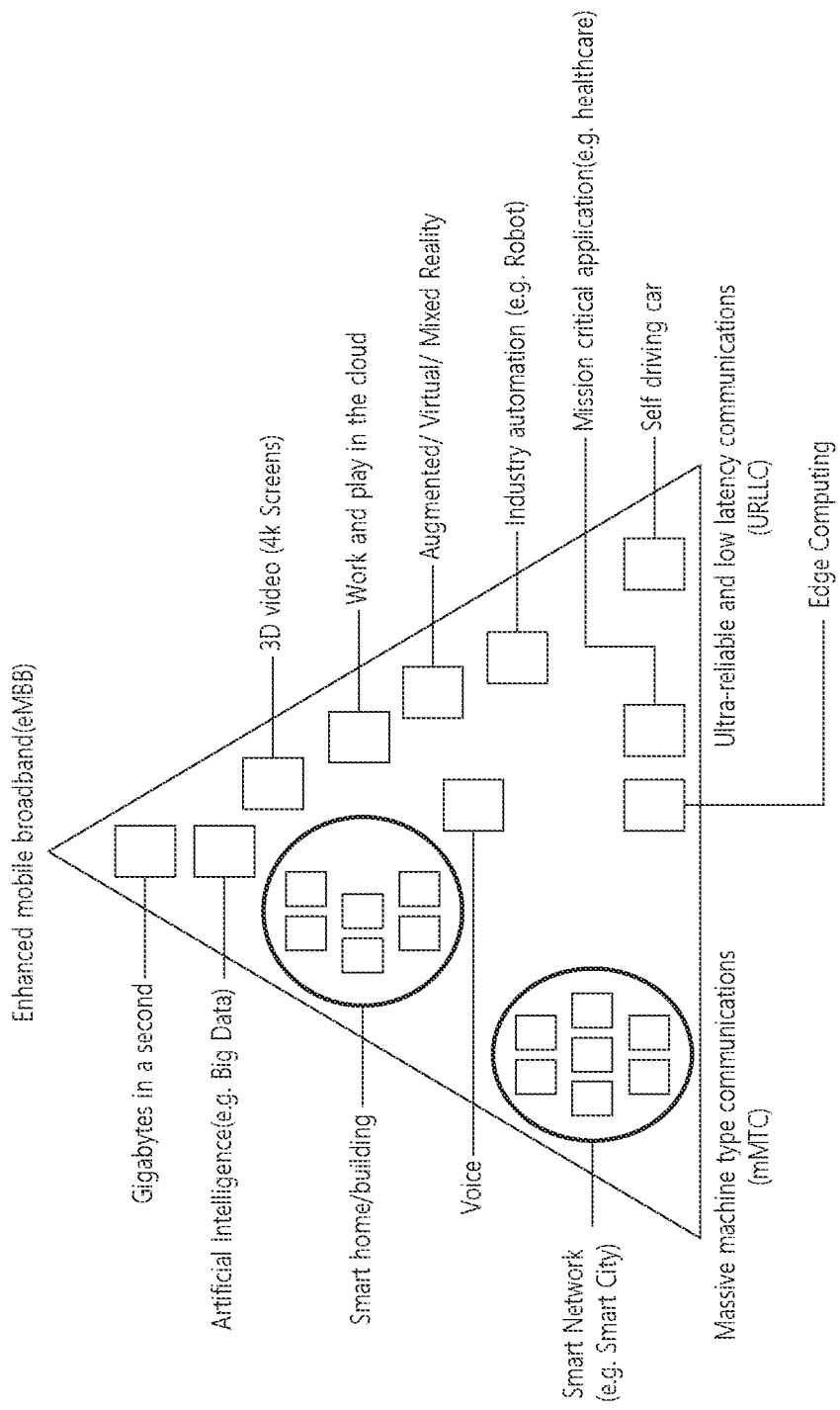
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

'Mobility' refers to a procedure for i) changing a PCell of a UE (i.e., handover or PCell change), ii) changing a PSCell of a UE (i.e., SN change or PSCell change), and/or iii) adding a PSCell for a UE (i.e., SN addition or PSCell addition). Therefore, the mobility may comprise at least one of a handover, an SN change or an SN addition. In other words, the mobility may comprise at least one of PCell change, PSCell change or PSCell addition. Throughout the disclosure, performing a mobility to a target cell may refer to applying a mobility command of the target cell or applying a target cell configuration for the target cell in the mobility command of the target cell. The target cell configuration for the target cell may comprise RRC reconfiguration parameters associated with the mobility to the target cell. Further, RRC reconfiguration and RRC connection reconfiguration may be used interchangeably.

In the disclosure, the target cell configuration may also be referred to as candidate cell configuration. The candidate cell configuration may comprise reconfigurationWithSync, which comprise parameters for the synchronous reconfiguration to the target SpCell. For example, the reconfigurationWithSync may comprise at least one of rach-ConfigDedicated or smtc. The rach-ConfigDedicated may indicate a random access configuration to be used for a reconfiguration with sync (e.g., mobility). The smtc may indicate a synchronization signal/physical broadcast channel (SS/PBCH) block periodicity/offset/duration configuration of target cell for PSCell change, PCell change and/or PSCell addition. The SS/PBCH block may be simply referred to as synchronization signal block (SSB).

'SN mobility' refers to a procedure for i) changing a PSCell of a UE (i.e., SN change or PSCell change), and/or ii) adding a PSCell for a UE (i.e., SN addition or PSCell addition). Therefore, the SN mobility may comprise at least one of an SN change or an SN addition. In other words, the SN mobility may comprise at least one of PSCell change or PSCell addition. Throughout the disclosure, performing an SN mobility to a target cell may refer to applying an SN mobility command of the target cell or applying a target cell configuration for the target cell in the SN mobility command of the target cell. The target cell configuration for the target cell may comprise RRC reconfiguration parameters associated with the SN mobility to the target cell. The SN mobility may be a kind of a mobility. The SN mobility command may comprise a SN change command for performing SN change, or SN addition command for performing SN addition.

'Mobility condition for a target cell' refers to a triggering condition for a mobility to the target cell. That is, the mobility condition for a target cell refers to a condition that should be satisfied for triggering a mobility to the target cell. Mobility condition may comprise at least one of event A3 condition (i.e., mobility condition for event A3) or event A5 condition (i.e., mobility condition for event A5). The event A3 condition may comprise at least one of an offset value, or a time-to-trigger (TTT). The event A5 condition may comprise at least one of a serving cell threshold, a target cell threshold, or a TTT. The mobility condition for an event may be satisfied if/when an entering condition (or, also referred to as entry condition) for the event is satisfied for at least the TTT. For example, the entering condition for event A3 may be satisfied if a signal quality for a target cell is better than that for a serving cell more than or equal to the offset value. For another example, an entering condition for event A5 may be satisfied if a signal quality for a target cell is better than the target cell threshold and a signal quality for a serving cell is lower than the serving cell threshold. The mobility condition may also be referred to as an execution condition/conditional execution condition/conditional mobility execution condition (e.g., CHO execution condition).

'SN mobility condition for a target cell' refers to a triggering condition for an SN mobility (i.e., SN addition or SN change) to the target cell. That is, the SN mobility condition for a target cell refers to a condition that should be satisfied for triggering an SN mobility to the target cell. SN mobility condition for a target cell may be classified as:

i) SN addition condition for a target cell, which refers to a triggering condition for an SN addition of the target cell; or ii) SN change condition for a target cell, which refers to a triggering condition for an SN change to the target cell.

SN mobility condition may comprise at least one of an event, time-to-trigger (TTT), offset value, or threshold value(s). The SN mobility condition for an event may be satisfied if an entering condition for the event is satisfied for at least the TTT.

For example, SN addition condition may be related to event A4 or event B1. The entering condition for event A4 or B1 may be satisfied if a signal quality for a target cell is better than a threshold.

For example, SN change condition may be related to event A3 or event A5. The entering condition for event A3 may be satisfied if a signal quality for a target cell is better than that for a source PScell more than or equal to the offset value. For another example, the entering condition for event A5 may be satisfied if a signal quality for a target cell is better than a first threshold and a signal quality for a source PScell is lower than a second threshold.

'Conditional mobility' refers to a mobility that is performed to a target cell which satisfies a triggering condition among a plurality of candidate target cells. Throughout the disclosure, performing a conditional mobility to a target cell may refer to applying a conditional mobility command of a target cell which satisfies a mobility condition for the target cell among a plurality of candidate target cells or applying a target cell configuration for the target cell in the conditional mobility command of the target cell which satisfies a mobility condition for the target cell among the plurality of candidate target cells. The target cell configuration for the target cell may comprise RRC reconfiguration parameters associated with the conditional mobility to the target cell. Conditional mobility may comprise a conditional handover (i.e., conditional PCell change), a conditional SN change (i.e., conditional PSCell change (CPC)), and/or conditional SN addition (i.e., conditional PSCell addition (CPA)). The conditional PSCell addition/change (CPAC) may comprise the CPC and/or the CPA.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', ' channel state/reference signal received power (RSRP)' and ' reference signal received quality (RSRQ)' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHZ | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHZ | 60, 120, 240 kHz |

Figure 2:
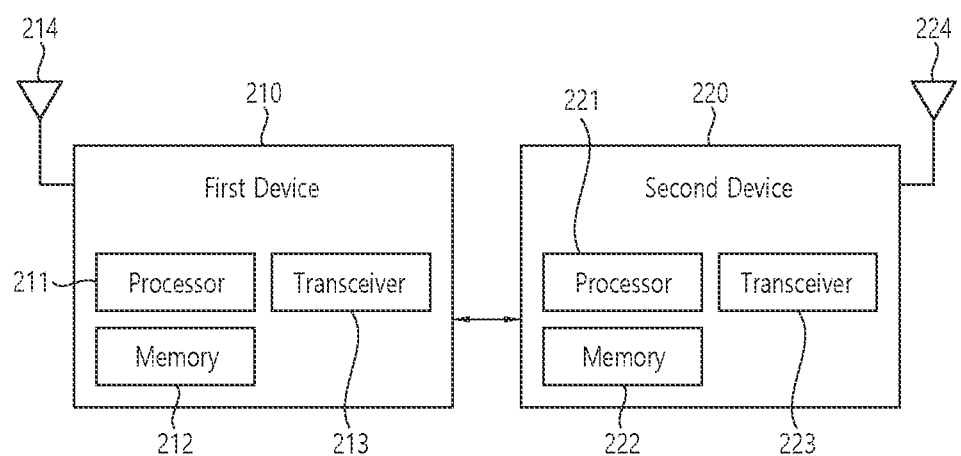
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
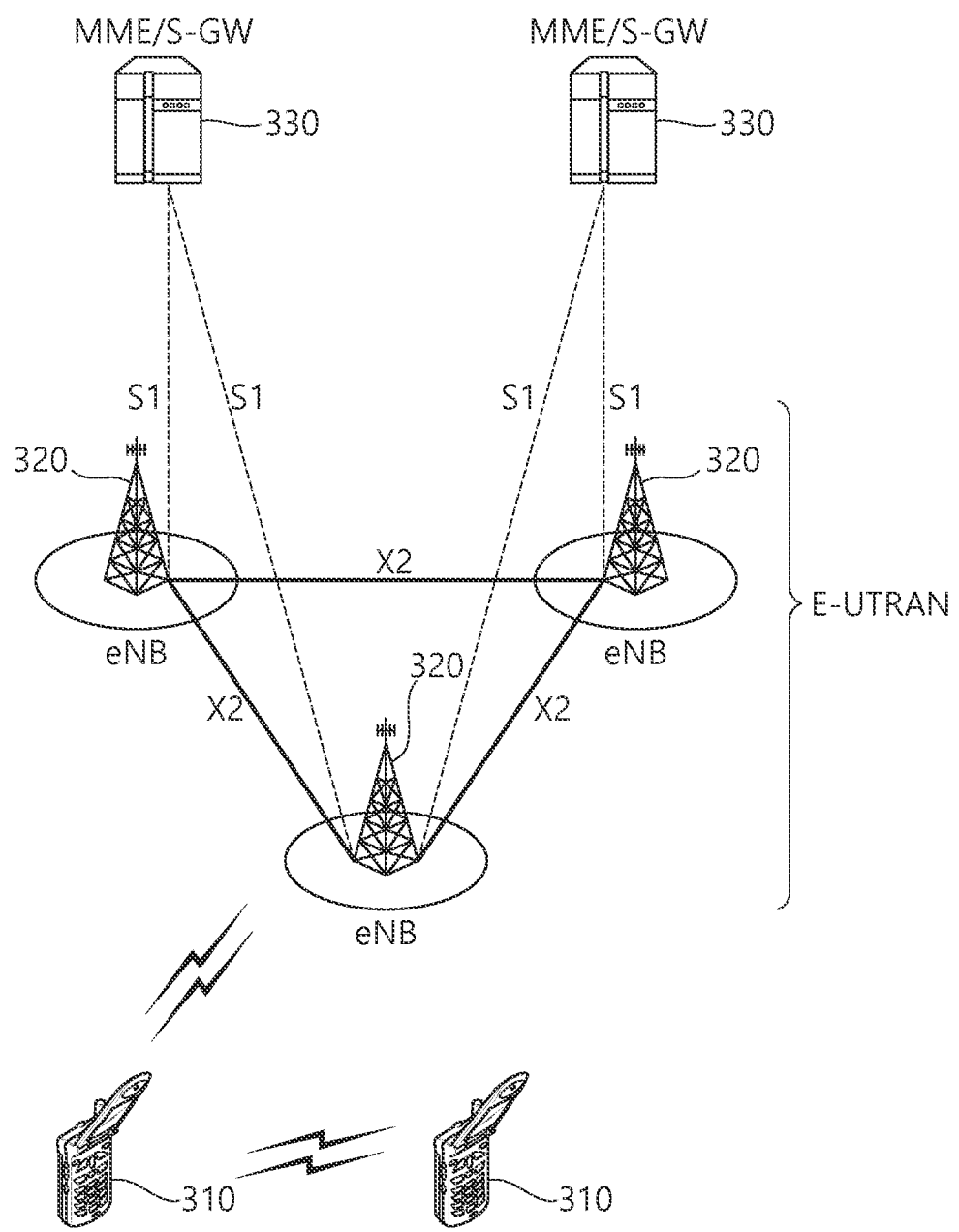
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
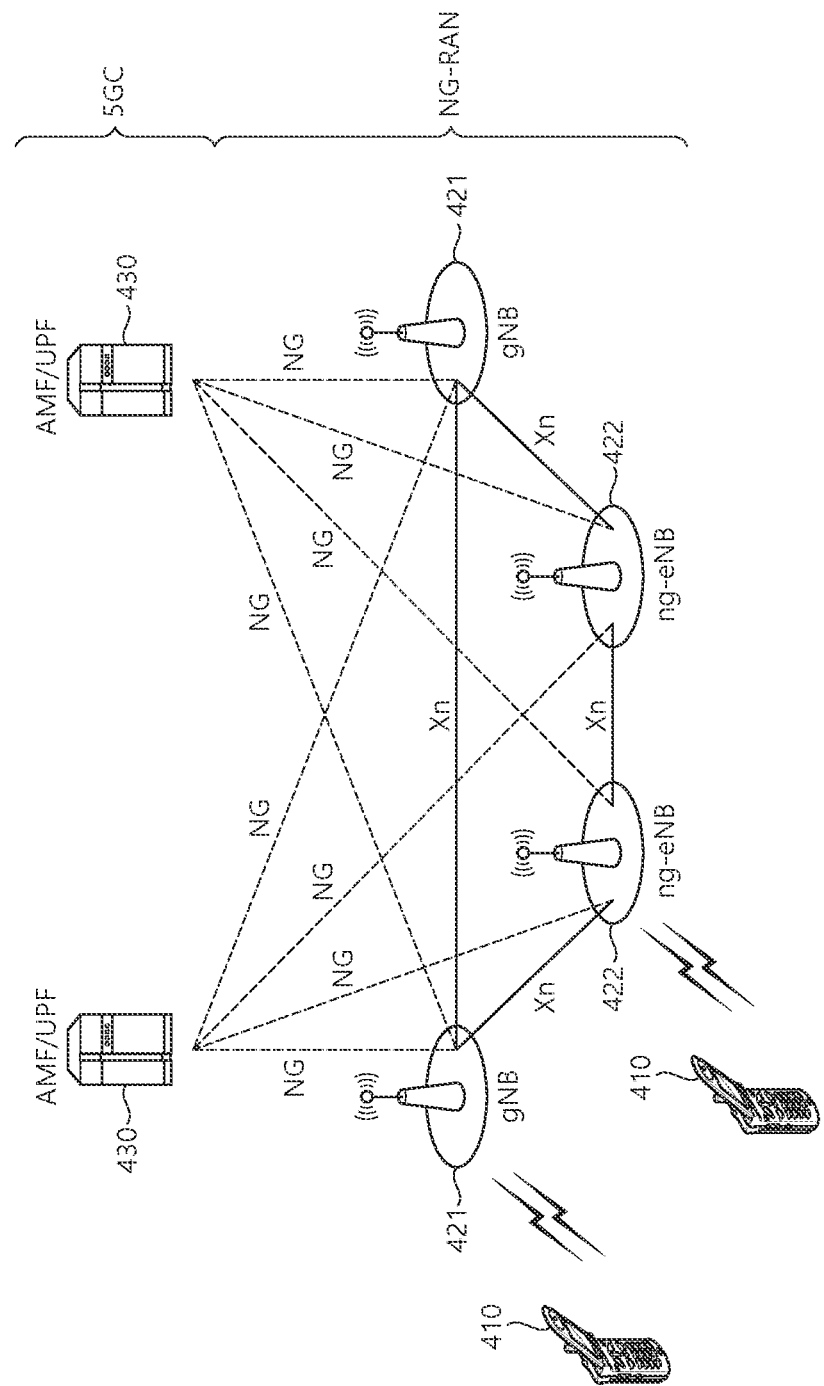
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NW") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
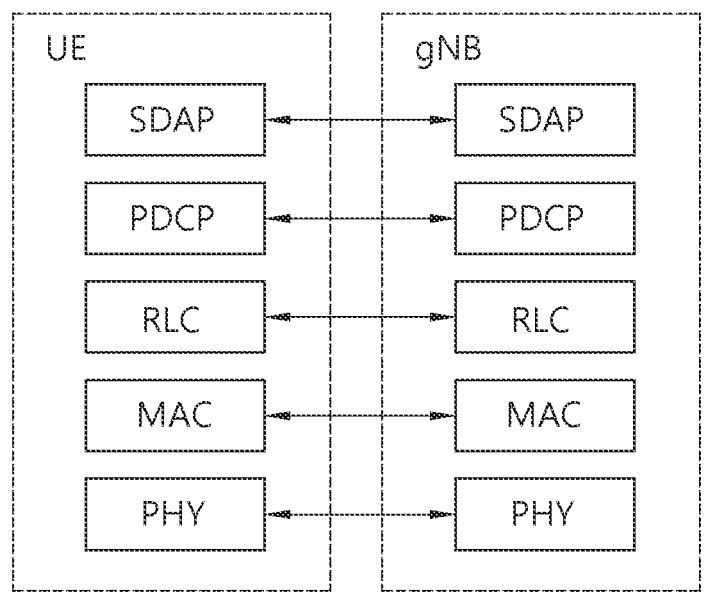
FIG. 5 shows a block diagram of a user plane protocol stack to which the technical features of the present disclosure can be applied.
Figure 6:
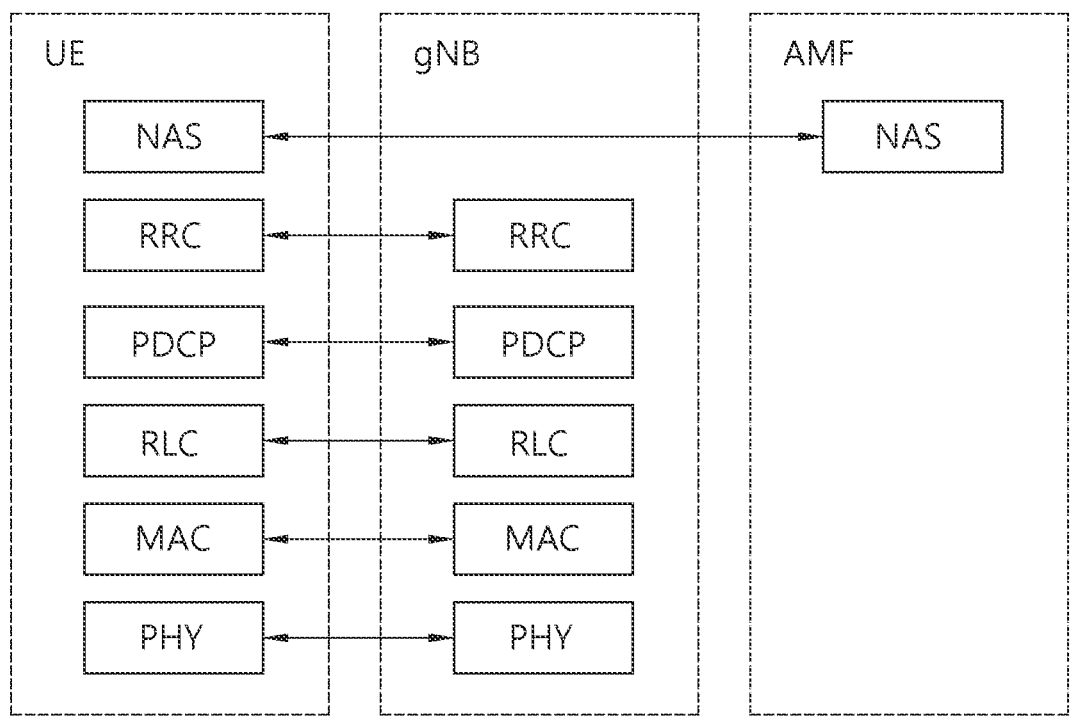
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
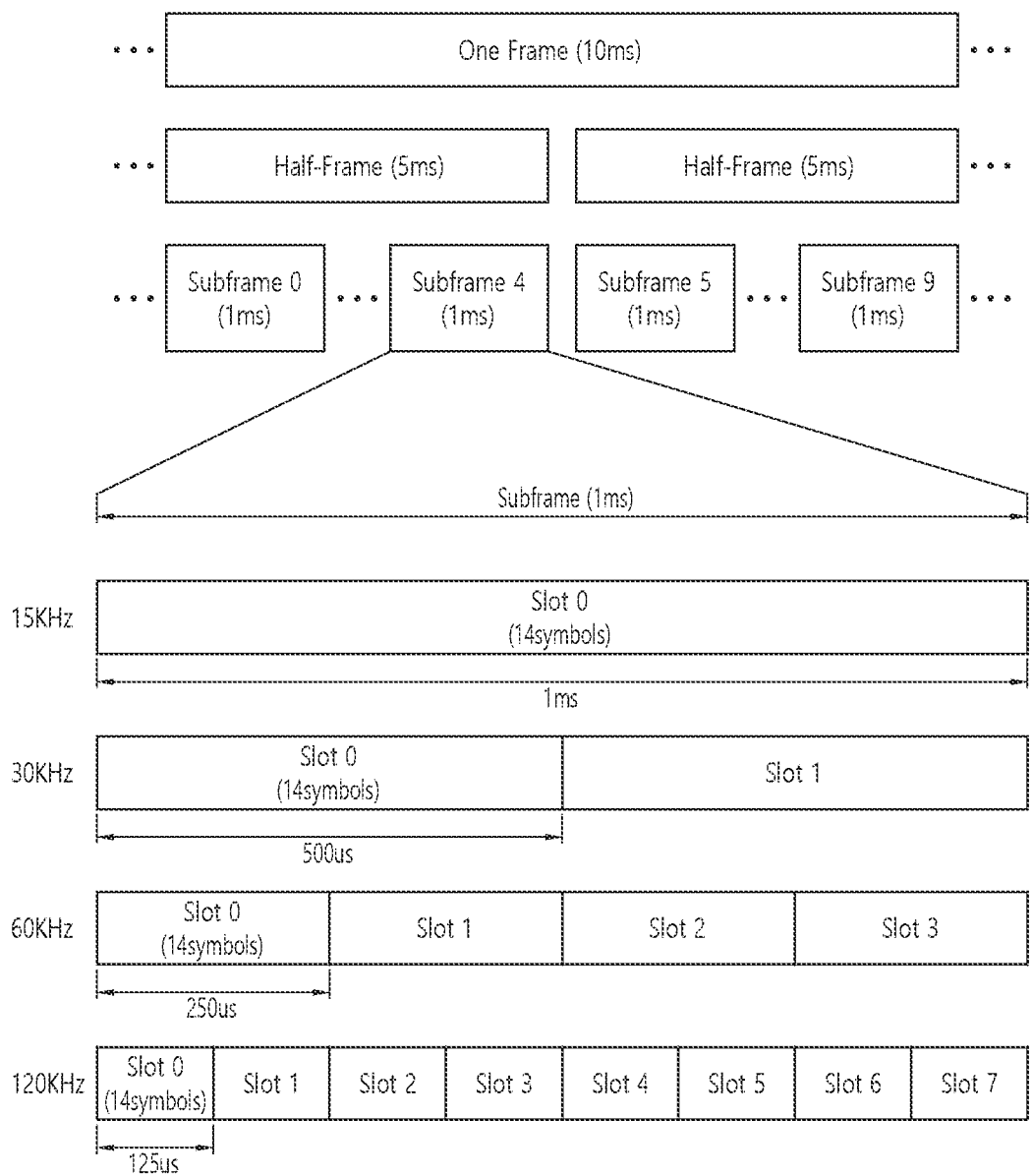
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2u*15$ kHz. The following table shows the number of OFDM symbols per slot, the number of slots per frame, and the number of slots per for the normal CP, according to the subcarrier spacing $\Delta f = 2u*15$ kHz.

TABLE 3

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f = 2u*15$ kHz.

TABLE 4

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
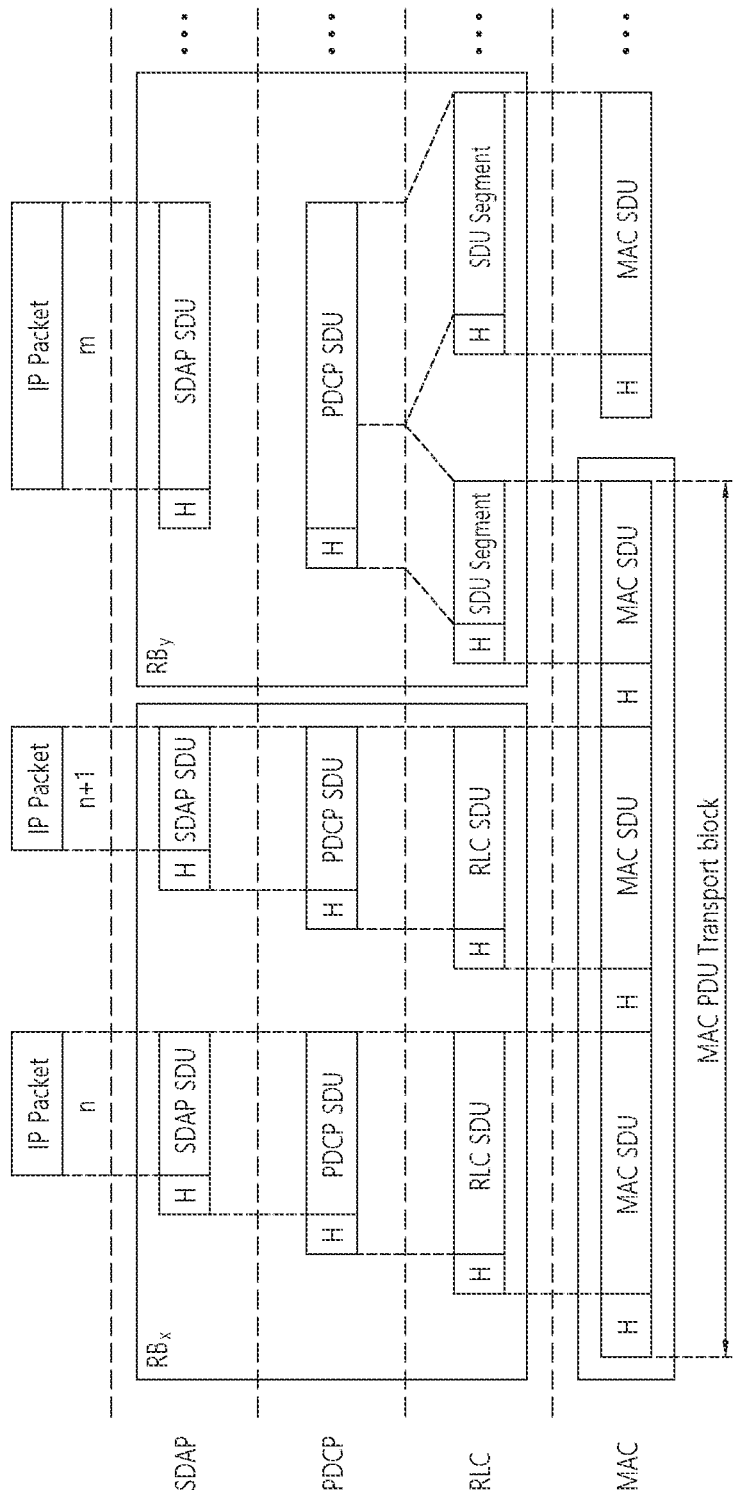
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Hereinafter, signalling radio bearer (SRB) is described.

Signalling radio bearer may be defined as a radio bearer (RB) that is used only for a transmission of RRC and/or NAS messages. More specifically, the following SRBs may be defined:

SRB0 may be used for RRC messages using the CCCH logical channel;

SRB1 may be used for RRC messages (which may include a piggybacked NAS message) as well as for NAS messages prior to the establishment of SRB2, all using DCCH logical channel;

SRB2 may be used for NAS messages and for RRC messages which include logged measurement information, all using DCCH logical channel. SRB2 has a lower priority than SRB1 and may be configured by the network after AS security activation; and SRB3 may be used for specific RRC messages when UE is in DC (e.g., (NG)EN-DC and/or NR-DC), all using DCCH logical channel.

In downlink, piggybacking of NAS messages may be used only for one dependant (i.e. with joint success/failure) procedure: bearer establishment/modification/release. In uplink, piggybacking of NAS message may be used only for transferring the initial NAS message during connection setup and connection resume.

The NAS messages transferred via SRB2 may also be contained in RRC messages, which however do not include any RRC protocol control information.

Once AS security is activated, all RRC messages on SRB1, SRB2 and SRB3, including those containing NAS messages, may be integrity protected and ciphered by PDCP. NAS may independently apply integrity protection and ciphering to the NAS messages.

Split SRB may be supported for all the MR-DC options in both SRB1 and SRB2 (split SRB may not be supported for SRB0 and SRB3).

For operation with shared spectrum channel access, SRB0, SRB1 and SRB3 may be assigned with the highest priority Channel Access Priority Class (CAPC), (i.e. CAPC=1) while CAPC for SRB2 is configurable.

Figure 9:
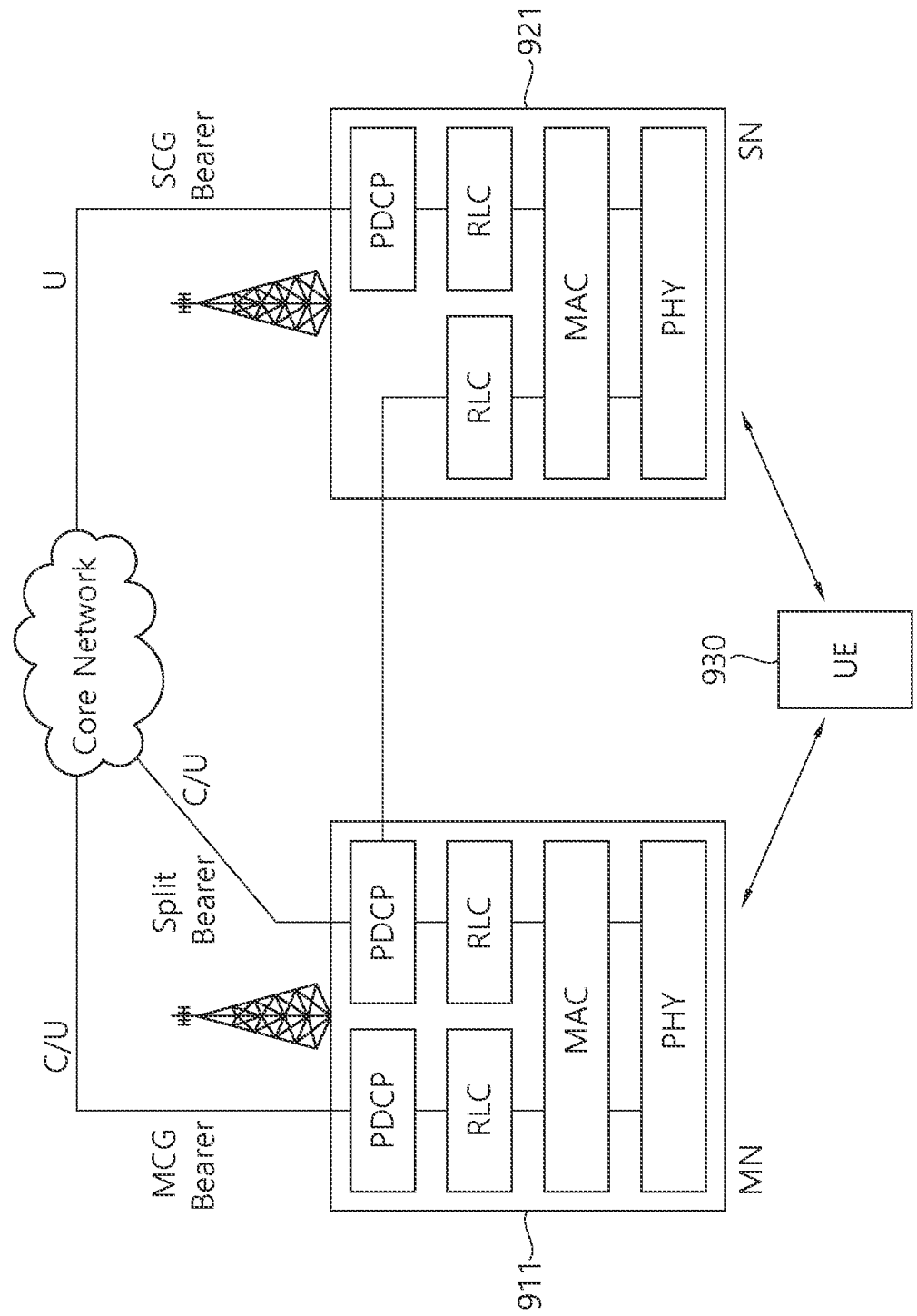
FIG. 9 shows an example of a dual connectivity (DC) architecture to which technical features of the present disclosure can be applied.

FIG. 9 shows an example of a dual connectivity (DC) architecture to which technical features of the present disclosure can be applied.

Referring to FIG. 9, MN 911, SN 921, and a UE 930 communicating with both the MN 911 and the SN 921 are illustrated. As illustrated in FIG. 9, DC refers to a scheme in which a UE (e.g., UE 930) utilizes radio resources provided by at least two RAN nodes comprising a MN (e.g., MN 911) and one or more SNs (e.g., SN 921). In other words, DC refers to a scheme in which a UE is connected to both the MN and the one or more SNs, and communicates with both the MN and the one or more SNs. Since the MN and the SN may be in different sites, a backhaul between the MN and the SN may be construed as non-ideal backhaul (e.g., relatively large delay between nodes).

MN (e.g., MN 911) refers to a main RAN node providing services to a UE in DC situation. SN (e.g., SN 921) refers to an additional RAN node providing services to the UE with the MN in the DC situation. If one RAN node provides services to a UE, the RAN node may be a MN. SN can exist if MN exists.

For example, the MN may be associated with macro cell whose coverage is relatively larger than that of a small cell. However, the MN does not have to be associated with macro cell—that is, the MN may be associated with a small cell.

Throughout the disclosure, a RAN node that is associated with a macro cell may be referred to as 'macro cell node'. MN may comprise macro cell node.

For example, the SN may be associated with small cell (e.g., micro cell, pico cell, femto cell) whose coverage is relatively smaller than that of a macro cell. However, the SN does not have to be associated with small cell—that is, the SN may be associated with a macro cell. Throughout the disclosure, a RAN node that is associated with a small cell may be referred to as 'small cell node'. SN may comprise small cell node.

The MN may be associated with a master cell group (MCG). MCG may refer to a group of serving cells associated with the MN, and may comprise a primary cell (PCell) and optionally one or more secondary cells (SCells). User plane data and/or control plane data may be transported from a core network to the MN through a MCG bearer. MCG bearer refers to a bearer whose radio protocols are located in the MN to use MN resources. As shown in FIG. 9, the radio protocols of the MCG bearer may comprise PDCP, RLC, MAC and/or PHY.

The SN may be associated with a secondary cell group (SCG). SCG may refer to a group of serving cells associated with the SN, and may comprise a primary secondary cell (PSCell) and optionally one or more SCells. User plane data may be transported from a core network to the SN through a SCG bearer. SCG bearer refers to a bearer whose radio protocols are located in the SN to use SN resources. As shown in FIG. 9, the radio protocols of the SCG bearer may comprise PDCP, RLC, MAC and PHY.

User plane data and/or control plane data may be transported from a core network to the MN and split up/duplicated in the MN, and at least part of the split/duplicated data may be forwarded to the SN through a split bearer. Split bearer refers to a bearer whose radio protocols are located in both the MN and the SN to use both MN resources and SN resources. As shown in FIG. 9, the radio protocols of the split bearer located in the MN may comprise PDCP, RLC, MAC and PHY. The radio protocols of the split bearer located in the SN may comprise RLC, MAC and PHY.

According to various embodiments, PDCP anchor/PDCP anchor point/PDCP anchor node refers to a RAN node comprising a PDCP entity which splits up and/or duplicates data and forwards at least part of the split/duplicated data over X2/Xn interface to another RAN node. In the example of FIG. 9, PDCP anchor node may be MN.

According to various embodiments, the MN for the UE may be changed. This may be referred to as handover, or a MN handover.

According to various embodiments, a SN may newly start providing radio resources to the UE, establishing a connection with the UE, and/or communicating with the UE (i.e., SN for the UE may be newly added). This may be referred to as a SN addition.

According to various embodiments, a SN for the UE may be changed while the MN for the UE is maintained. This may be referred to as a SN change.

According to various embodiments, DC may comprise E-UTRAN NR-DC (EN-DC), and/or multi-radio access technology (RAT)-DC (MR-DC). EN-DC refers to a DC situation in which a UE utilizes radio resources provided by E-UTRAN node and NR RAN node. MR-DC refers to a DC situation in which a UE utilizes radio resources provided by RAN nodes with different RATs.

Figure 10:
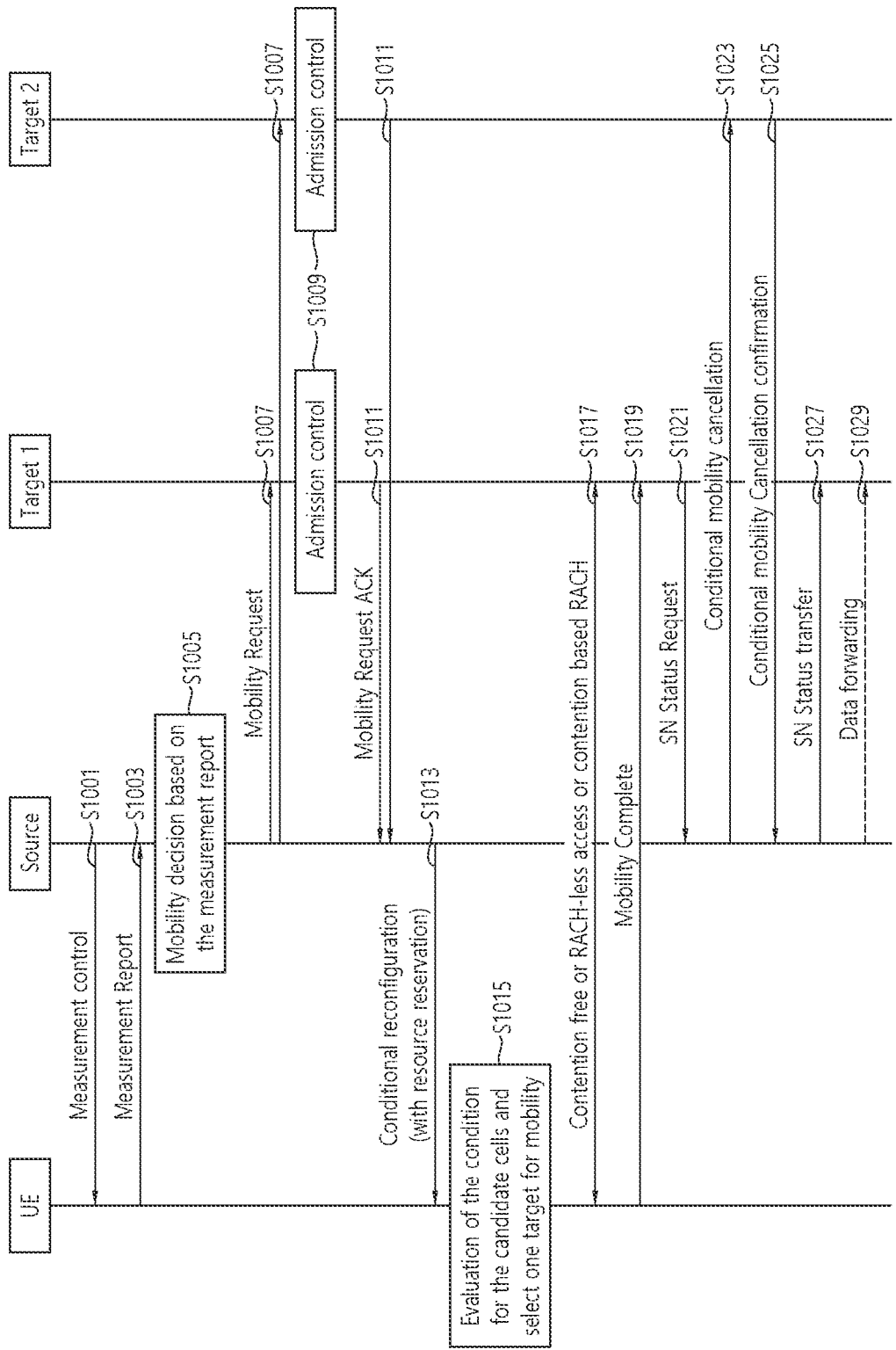
FIG. 10 shows an example of a conditional mobility procedure to which technical features of the present disclosure can be applied.

FIG. 10 shows an example of a conditional mobility procedure to which technical features of the present disclosure can be applied. The steps illustrated in FIG. 10 can also be applied to a conditional handover procedure, conditional SN addition procedure and/or conditional SN change procedure.

Referring to FIG. 10, in step S1001, the source cell may transmit measurement control message to the UE. The source cell may configure the UE measurement procedures according to the roaming and access restriction information and, for example, the available multiple frequency band information through the measurement control message. Measurement control information provided by the source cell through the measurement control message may assist the function controlling the UE's connection mobility. For example, the measurement control message may comprise measurement configuration and/or report configuration.

In step S1003, the UE may transmit a measurement report message to the source cell. The measurement report message may comprise a result of measurement on neighbor cell(s) around the UE which can be detected by the UE. The UE may generate the measurement report message according to a measurement configuration and/or measurement control information in the measurement control message received in step S1001.

In step S1005, the source cell may make a mobility decision based on the measurement report. For example, the source cell may make a mobility decision and determine candidate target cells (e.g., target cell 1 and target cell 2) for mobility among neighbor cells around the UE based on a result of measurement (e.g., signal quality, reference signal received power (RSRP), reference signal received quality (RSRP)) on the neighbor cells.

In step S1007, the source cell may transmit mobility request messages to the target cell 1 and the target cell 2 which are determined in step S1005. That is, the source cell may perform mobility preparation with the target cell 1 and the target cell 2. The mobility request message may comprise necessary information to prepare the mobility at the target side (e.g., target cell 1 and target cell 2).

In step S1009, each of the target cell 1 and the target cell 2 may perform an admission control based on information included in the mobility request message. The target cell may configure and reserve the required resources (e.g., C-RNTI and/or RACH preamble). The AS-configuration to be used in the target cell can either be specified independently (i.e. an "establishment") or as a delta compared to the AS-configuration used in the source cell (i.e. a "reconfiguration").

In step S1011, the target cell and the target cell 2 may transmit a mobility request acknowledge (ACK) message to the source cell. The mobility request ACK message may comprise information on resources reserved and prepared for a mobility. For example, the mobility request ACK message may comprise a transparent container to be sent to the UE as an RRC message to perform the mobility. The container may include a new C-RNTI, target gNB security algorithm identifiers for the selected security algorithms, a dedicated RACH preamble, and/or possibly some other parameters i.e. access parameters, SIBs. If RACH-less mobility is configured, the container may include timing adjustment indication and optionally a preallocated uplink grant. The mobility request ACK message may also include RNL/TNL information for forwarding tunnels, if necessary. As soon as the source cell receives the mobility request ACK message, or as soon as the transmission of the conditional mobility command is initiated in the downlink, data forwarding may be initiated.

In step S1013, the source cell may transmit a conditional reconfiguration to the UE. The conditional reconfiguration may be also referred to as (or, may comprise) conditional handover (CHO) configuration and/or a conditional mobility command (e.g., CHO command). The conditional reconfiguration may comprise a conditional reconfiguration for each of the candidate target cells (e.g., target cell 1, target cell 2). For example, the conditional reconfiguration may comprise a conditional reconfiguration for the target cell 1, and a conditional reconfiguration for the target cell 2. The conditional reconfiguration for the target cell 1 may comprise a mobility condition for the target cell 1, and a target cell configuration for the target cell 1. The target cell configuration for the target cell 1 may comprise RRC reconfiguration parameters associated with a mobility to the target cell 1, including information on resources reserved for the mobility to the target cell 1. Similarly, the conditional reconfiguration for the target cell 2 may comprise a mobility condition for the target cell 2, and a target cell configuration for the target cell 2. The target cell configuration for the target cell 2 may comprise RRC reconfiguration parameters associated with a mobility to the target cell 2, including information on resources reserved for the mobility to the target cell 2.

The mobility condition may inform at least one measurement ID. For example, the mobility condition may inform at most 2 measurement IDs. If a mobility condition of a target cell informs a measurement ID which is related to a measurement object A and a report configuration B, evaluating the mobility condition may comprise determining whether a measurement result on the measurement object A satisfies a report condition in the report configuration B. If the measurement result on the measurement object A satisfies the report condition in the report configuration B according to the evaluation of the mobility condition, the UE may determine that the mobility condition of the target cell is satisfied (or, the target cell/measurement result for the target cell satisfies the mobility condition of the target cell), and perform a mobility to the target cell.

In step S1015, the UE may perform an evaluation of the mobility condition for the candidate target cells (e.g., target cell 1, target cell 2) and select a target cell for a mobility among the candidate target cells. For example, the UE may perform measurements on the candidate target cells, and determine whether a candidate target cell satisfies a mobility condition for the candidate target cell among the candidate target cells based on a result of the measurements on the candidate target cells. If the UE identifies that the target cell 1 satisfies a mobility condition for the target cell 1, the UE may select the target cell 1 as a target cell for the mobility.

In step S1017, the UE may perform a random access to the selected target cell (e.g., target cell 1). For example, the UE may transmit a random access preamble to the target cell 1, and receive a random access response comprising an uplink grant from the target cell 1. If RACH-less mobility is configured, the step S1017 may be omitted, and the uplink grant may be provided in step S1013.

In step S1019, the UE may transmit a mobility complete message to the target cell 1. When the UE has successfully accessed the target cell 1 (or, received uplink grant when RACH-less mobility is configured), the UE may transmit a mobility complete message comprising a C-RNTI to confirm the mobility, along with uplink buffer status report, whenever possible, to the target cell 1 to indicate that the mobility procedure is completed for the UE. The target cell 1 may verify the C-RNTI transmitted in the mobility complete message.

In step S1021, the target cell 1 may transmit a sequence number (SN) status request message to the source cell. The target cell 1 may request the source cell to inform the target cell 1 of a SN of a packet the target cell 1 has to transmit after the mobility, via the SN status request message.

In step S1023, the source cell may transmit a conditional mobility cancellation message to the target cell 2 which is not selected as a target cell for a mobility among the candidate target cells. After receiving the conditional mobility cancellation message, the target cell 2 may release resources that are reserved in case of a mobility.

In step S1025, the target cell 2 may transmit a conditional mobility cancellation confirmation message to the source cell, as a response for the conditional mobility cancellation message. The conditional mobility cancellation confirmation message may inform that the target cell 2 has released resources reserved in case of a mobility.

In step S1027, the source cell may transmit a SN status transfer message to the target cell 1, as a response for the SN status request message. The SN status transfer message may inform the target cell 1 of a SN of a packet the target cell 1 has to transmit after the mobility.

In step S1029, the source cell may perform a data forwarding to the target cell 1. For example, the source cell may forward data received from a core network to the target cell 1 so that the target cell 1 can now transmit the data to the UE.

Conditional mobility is a kind of conditional reconfiguration. Hereinafter, Conditional reconfiguration is described.

The network may configure the UE with conditional reconfiguration (i.e., conditional handover and/or conditional PSCell addition/change) including per candidate target cell an RRCConnectionReconfiguration (i.e., conditional mobility command) to only be applied upon the fulfilment of an associated execution condition (i.e., mobility condition).

For conditional reconfiguration, the UE shall:
1> if the received conditionalReconfiguration includes the condReconfigurationToRemoveList:
2> perform the conditional reconfiguration removal procedure;
1> if the received conditionalReconfiguration includes the condReconfigurationToAddModList:
2> perform the conditional reconfiguration addition/modification procedure.

I. Conditional Reconfiguration Addition/Modification
The UE shall:
1> for each condReconfigurationId (i.e., index related to a mobility command) included in the received condReconfigurationToAddModList:
2> if an entry with the matching condReconfigurationId exists in the condReconfigurationList within the VarConditionalReconfiguration (i.e., list of {index, mobility condition, mobility command} for each target cell stored in the UE):
3> replace the entry with the values received for this condReconfigurationId;
2> else:
3> add a new entry for this condReconfigurationId within the VarConditionalReconfiguration;
3> store the associated RRCConnectionReconfiguration (i.e., mobility command and/or mobility condition) in VarConditionalReconfiguration;
2> monitor the triggering conditions (i.e., mobility conditions) associated to the measurement identities of that condReconfigurationId;

II. Conditional Reconfiguration Removal

The UE shall:

1> for each condReconfigurationId included in the received condReconfigurationToRemoveList that is part of the current UE configuration in VarConditionalReconfiguration:

2> stop the monitoring of triggering conditions linked by the measurement identities;

2> remove the entry with the matching condReconfigurationId from the condReconfigurationList within the VarConditionalReconfiguration;

The UE does not consider the conditional reconfiguration message as erroneous if the condReconfigurationToRemoveList includes any condReconfigurationId value that is not part of the current UE configuration.

III. Conditional Reconfiguration Execution

For the measId for which the triggering condition for conditional reconfiguration was fulfilled, the UE shall:

1> for each condReconfigurationId within the VarConditionalReconfiguration that has that measId associated to its stored RRCConnectionReconfiguration (i.e., mobility command):

2> if all triggering conditions are fulfilled for that condReconfigurationId:

3> consider the target cell candidate within the stored RRCConnectionReconfiguration, associated to that condReconfigurationId, as a triggered cell;

1> if the more than one triggered cell exists:

2> select one of the triggered cells as the selected cell for conditional reconfiguration;

1> for the selected cell of conditional reconfiguration:

2> if the stored RRCConnectionReconfiguration associated to the selected cell includes mobilityControlInfo (conditional handover):

3> apply the stored RRCConnectionReconfiguration associated to that condReconfigurationId and perform a handover to the selected cell;

2> else if the stored RRCConnectionReconfiguration includes nr-Config (conditional PSCell addition/change):

3> apply the stored RRCConnectionReconfiguration associated to that condReconfigurationId and perform the SN change/addition procedure for the selected cell;

If multiple cells are triggered in conditional PSCell addition/change execution, the UE may consider beams and beam quality to select one of the triggered cells for execution.

The structure of the conditional reconfiguration message or the information element (IE) ConditionalReconfiguration may be as the following Table 5. The IE ConditionalReconfiguration may be used to add, modify or release the configuration of a conditional handover, a conditional PSCell addition/change per target candidate cell.

TABLE 5

| |
|---|
| -- ASN1STARTConditionalReconfiguration-r16 ::= SEQUENCE { condReconfigurationToAddModList-r16 CondReconfigurationToAddModList-r16 OPTIONAL, -- Need ONcondReconfigurationToRemoveList-r16 CondReconfigurationToRemoveList-r16 OPTIONAL, -- Need ON...}CondReconfigurationToRemoveList-r16 ::= SEQUENCE (SIZE (1..maxCondConfig-r16)) OF CondReconfigurationId-r16-- ASN1STOP |

In Table 5, condReconfigurationToAddModList may refer to list of conditional reconfigurations (i.e. conditional handover or conditional PSCell change/addition) to add and/or modify. Also, condReconfigurationToRemoveList may refer to list of conditional reconfigurations (i.e. conditional handover or conditional PSCell change/addition) to remove. CondReconfigurationId may refer to an index related to a mobility command. The contents of the IE CondReconfigurationId may be as the following Table 6. The IE ConditionalReconfigurationId may be used to identify a conditional reconfiguration.

TABLE 6

| |
|---|
| -- ASN1STARTCondReconfigurationId-r16 ::= INTEGER (1.. maxCondConfig-r16) -- ASN1STOP |

In Table 6, maxCondConfig may refer to the maximum number of conditional reconfigurations (i.e., CondReconfigurationAddMods). The structure of IE CondReconfigurationToAddModList may be as the following Table 7. The IE CondReconfigurationToAddModList may concern a list of conditional reconfigurations (i.e. conditional handover, conditional PSCell addition/change) to add or modify, with for each entry the measId (associated to the triggering condition configuration) and the associated RRCConnectionReconfiguration.

TABLE 7

| |
|---|
| -- ASN1STARTCondReconfigurationToAddModList-r16 := SEQUENCE (SIZE (1.. maxCondConfig-r16)) OF CondReconfigurationAddMod-r16CondReconfigurationAddMod-r16 ::= SEQUENCE {condReconfigurationId-r16CondReconfigurationId-r16,triggerCondition-r16SEQUENCE (SIZE (1 .. 2)) OF MeasId,condReconfigurationToApply-r16OCTET STRING (CONTAINING RRCConnectionReconfiguration),...}-- ASN1STOP |

In Table 7, CondReconfigurationAddMod may refer to a conditional reconfiguration for a target cell. CondReconfigurationId may refer to an index of the CondReconfigurationAddMod, which may be related to a mobility command of the target cell. The triggerCondition may refer to a mobility condition for the target cell. The RRCConnectionReconfiguration contained in the condReconfiguration- ToApply may refer to a mobility command of the target cell. As described above, the conditional reconfiguration may also be referred to as CHO configuration. The structure of the CHO configuration or IE CHOConfiguration may be as the following Table 8:

TABLE 8

CHOConfiguration ::= SEQUENCE { choToReleaseList-r16CHOToReleaseList-r16OPTIONAL,-- Need NchoToAddModList-r16CHOToAddModList-r16OPTIONAL-- Need NchoConditionListSEQUENCE (SIZE (1..maxFFS)) OF CHOCondition-r16 OPTIONAL}CHOToReleaseList-r16 ::=SEQUENCE (SIZE (1..maxCHO)) OF CHOToRelease-r16CHOToRelease-r16 ::=SEQUENCE {choId-r16INTEGER (1 .. maxCHO)}CHOToAddModList-r16 ::=SEQUENCE (SIZE (1..maxCHO)) OF CHOToAddMod-r16CHOToAddMod-r16 ::= SEQUENCE {choId-r16INTEGER (1..maxCHO),conditionId-r16ReportConfigId OPTIONAL,-- Need MchoCellConfiguration-r16OCTET STRING (CONTAINING FFS for CHOCellConfiguration-r16)OPTIONAL,-- Need M}

In Table 8, CHOToReleaseList may correspond to condReconfigurationToRemoveList. CHOToAddModList may correspond to CondReconfigurationToAddModList. CHOCondition may correspond to triggerCondition. The maxCHO may correspond to maxCondConfig. That is, the maxCHO may refer to the maximum number of CHO configurations (i.e., CHOToAddMods). The choId may correspond to condReconfigurationId. CHOToAddMod may correspond to CondReconfigurationToAddMod, which may refer to a CHO configuration for a target cell. The choId may refer to an index of the CondReconfigurationToAddMod, which may be related to a mobility command of the target cell. The conditionId may refer to an index of the CHOCondition (i.e., mobility condition for the target cell), which may be related to a choConditionConfig. The CHOCellConfiguration contained in the choCellConfiguration may refer to a mobility command of the target cell. The choCellConfiguration may correspond to condReconfigurationToApply. The structure of IE CHOCondition may be as the following Table 9:

TABLE 9

-- ASN1START-- TAG-CHOTRIGGERCONDITION-STARTCHOCondition-r16-IEs ::= SEQUENCE {conditionId-r16 ReportConfigIdchoConditionConfigCHOConditionConfig-r16OPTIONAL-- Cond NewID}CHOConditionConfig-r16-IE ::= SEQUENCE { eventId CHOICE { eventA3 SEQUENCE { a3-Offset MeasTriggerQuantityOffset, hysteresis Hysteresis, timeToTrigger TimeToTrigger, }, eventA5 SEQUENCE { a5-Threshold1 MeasTriggerQuantity, a5-Threshold2 MeasTriggerQuantity, hysteresis Hysteresis, timeToTrigger TimeToTrigger, }, ... }, rsType NR-RS-Type, ...}-- TAG-CHOTRIGGERCONDITION-STOP-- ASN1STOP In the disclosure, various timers may be defined as the following table 10:

TABLE 10

| Timer | Start | Stop | At expiry |
|---|---|---|---|
| T300 | Upon transmission of RRCSetupRequest | Upon reception of RRCSetup or RRCReject message, cell re-selection and upon abortion of connection establishment by upper layers. | Inform upper layers about the failure to establish RRC connection. |
| T301 | Upon transmission of RRCReestabilshmentRequest | Upon reception of RRCReestablishment or RRCSetup message as well as when the selected cell becomes unsuitable | Go to RRC_IDLE |
| T304 | Upon reception of RRCReconfiguration message including reconfigurationWithSync or upon conditional reconfiguration execution i.e. when applying a stored RRCReconfiguration message including reconfigurationWithSync. | Upon successful completion of random access on the corresponding SpCellFor T304 of SCG, upon SCG release | For T304 of MCG, in case of the handover from NR or intra-NR handover, initiate the RRC re-establishment procedure; In case of handover to NR, |

TABLE 10-continued

| Timer | Start | Stop | At expiry |
|---|---|---|---|
| | | | perform the actions defined in the specifications applicable for the source RAT. If any DAPS bearer is configured and if there is no RLF in source PCell, initiate the failure information procedure. For T304 of SCG, inform network about the reconfiguration with sync failure by initiating the SCG failure information procedure. |
| T307 | Reception of RRCConnectionReconfiguration message including MobilityControlInfoSCG (i.e., reception of PSCell mobility command). | Successful completion of random access on the PSCell, upon initiating re-establishment and upon SCG release. | Initiate the SCG failure information procedure. |
| T310 | Upon detecting physical layer problems for the SpCell i.e. upon receiving N310 consecutive out-of-sync indications from lower layers. | Upon receiving N311 consecutive in-sync indications from lower layers for the SpCell, upon receiving RRCReconfiguration with reconfigurationWithSync for that cell group, upon reception of MobilityFromNRCommand, upon the reconfiguration of rlf-TimersAndConstant, upon initiating the connection re-establishment procedure, upon conditional reconfiguration execution i.e. when applying a stored RRCReconfiguration message including reconfigurationWithSync for that cell group, and upon initiating the MCG failure information procedure. Upon SCG release, if the T310 is kept in SCG. | If the T310 is kept in MCG: If AS security is not activated: go to RRC_IDLE else: initiate the MCG failure information procedure or the connection re-establishment procedure or the procedure if any DAPS bearer is configured. If the T310 is kept in SCG, Inform E-UTRAN/NR about the SCG radio link failure by initiating the SCG failure information procedure. |
| T311 | Upon initiating the RRC connection re-establishment procedure | Upon selection of a suitable NR cell or a cell using another RAT. | Enter RRC_IDLE |
| T316 | Upon transmission of the MCGFailureInformation message | Upon receiving RRCRelease, RRCReconfiguration with reconfigurationwithSync for the PCell, MobilityFromNRCommand, or upon initiating the re-establishment procedure | Initiate the connection re-establishment procedure. |
| T319 | Upon transmission of RRCResume Request or RRCResume Request1. | Upon reception of RRCResume, RRCSetup, RRCRelease, RRCRelease with suspendConfig or RRCReject message, cell re-selection and upon abortion of connection establishment by upper layers. | Perform the actions upon going to RRC_IDLE. |

Hereinafter, fast MCG recovery is described. A UE may be configured with a timer T316. If the UE is configured with the timer T316, the UE may consider that the fast MCG recovery is available.

The UE may detect a radio link failure (RLF) of a MCG (or, detect a MCG failure/MCG RLF) according to the following procedure:
1> upon T310 expiry in PCell; or
1> upon random access problem indication from MCG MAC while neither T300, T301, T304, T311 nor T319 are running; or
1> upon indication from MCG RLC that the maximum number of retransmissions has been reached:
2> consider radio link failure to be detected for the MCG (i.e., RLF of the MCG/MCG failure).

Upon detecting the RLF of the MCG and fast MCG link recovery is not available (i.e., T316 is not configured), the UE may initiate a RRC connection re-establishment procedure. However, upon/after detecting the RLF of the MCG but fast MCG link recovery is available (i.e., T316 is configured), the UE shall:
1> if fast MCG link recovery is configured (i.e., T316 is configured); and
1> if SCG transmission is not suspended; and
1> if PSCell change is not ongoing (i.e., timer T304 for the NR PSCell is not running in case of NR-DC or timer T307 of the E-UTRA PSCell is not running in NE-DC):
2> initiate the MCG failure information procedure (also referred to as fast MCG recovery procedure) to report MCG radio link failure.

The purpose of the MCG failure information procedure may comprise informing NR MN about an MCG failure the UE has experienced (i.e., MCG radio link failure). A UE in RRC_CONNECTED, for which AS security has been activated with SRB2 and at least one DRB setup, may initiate the fast MCG link recovery procedure in order to continue the RRC connection without re-establishment.

A UE configured with split SRB1 or SRB3 may initiate the procedure to report MCG failures when neither MCG nor SCG transmission is suspended, fast MCG link recovery is configured (i.e. T316 is configured), and upon detecting a RLF of the MCG while T316 is not running.

Upon initiating the MCG failure information procedure, the UE shall:
1> suspend MCG transmission for all SRBs and DRBs, except SRB0;
1> reset MCG-MAC;
1> start timer T316;
1> if SRB1 is configured as split SRB:
2> submit the MCGFailureInformation message to lower layers for transmission via SRB1, upon which the procedure ends;
2> else (i.e. SRB3 configured):
3> submit the MCGFailureInformation message to lower layers for transmission embedded in NR RRC message ULlnformationTransferMRDC via SRB3.

For example, if the UE receives RRCReconfiguration message comprising reconfigurationWithSync for the PCell in response to the MCGFailureInformation message, the UE may determine that the fast MCG recovery succeeds, and stop the timer T316. For another example, if the UE receives MobilityFromNRCommand message in response to the MCGFailureInformation message, the UE may determine that the fast MCG recovery succeeds, and stop the timer T316. The UE may also stop the timer T316 upon receiving RRCRelease message, and/or upon initiating the RRC connection re-establishment procedure.

On the other hand, if T316 expires (i.e., fast MCG recovery fails), the UE may initiate the RRC connection re-establishment procedure.

In summary, if the fast MCG recovery is configured (i.e., T316 is configured), the UE may trigger an MCG fast recovery procedure in which a MCG failure information message is transmitted to the network via SCG, upon detecting a PCell failure (i.e., MCG failure). And if the fast MCG recovery fails (i.e., T316 expires), the UE may initiate the RRC re-establishment procedure. If the RRC re-establishment procedure results in success, during the RRC re-establishment procedure, the UE may: transmit a RRC re-establishment request message; receive RRC re-establishment message; and transmit RRC re-establishment complete message.

Hereinafter, CHO failure handling is described.

Upon initiation of the RRC re-establishment procedure, the UE shall:
1> start timer T311;
1> stop timer T316, if running;
1> perform cell selection in accordance with a cell selection process.

As a result of the cell selection in the cell selection process, the UE may select a suitable NR cell. Upon selecting a suitable NR cell and while the timer T311 is running, the UE shall:
1> if attemptCHO (i.e., conditional mobility attempt configuration) is configured; and
1> if the selected cell is one of the candidate cells in VarCHO-Config (i.e., if the selected cell is one of the candidate cells related to conditional mobility commands the UE has received and stored):
2> apply the stored cho-RRCReconfig associated to the selected cell (i.e., apply the stored candidate cell configuration for the selected cell) and perform a mobility to the selected cell.

In summary, during the RRC connection re-establishment procedure that is initiated after the fast MCG recovery fails, if the network configured the UE to try CHO at the selected CHO candidate cell (i.e., if the network configured the UE with attemptCHO and/or conditional mobility attempt configuration), the UE may perform a cell selection and if the selected cell is a CHO candidate, then the UE may attempt CHO execution. The UE may perform the CHO execution instead of performing legacy re-establishment, since the UE still has CHO candidate available.

Namely, the UE may firstly perform the fast MCG recovery according to the radio link failure procedure then, the UE may secondly perform the CHO based failure handing according to the RRC re-establishment procedure upon/after a failure of the fast MCG recovery.

Since different behaviour is required for CHO failure handling and MCG fast recovery in case RLF is detected on MCG and both CHO based failure handling and MCG fast recovery can be configured to one UE, the expected behaviour may have potential data interruption problem in case both CHO based failure handling and MCG fast recovery are configured and RLF is detected on MCG.

Then, the data interruption may be a problem in case both CHO based failure handling and MCG fast recovery are configured and RLF is detected on MCG. Since the UE cannot send data transmission during multiple failure recovery procedures (i.e., the fast MCG failure recovery and the CHO based failure handling), data interruption time may be increased than the legacy procedure.

Moreover, the data interruption time can be worse due to the high possibility of failure of the CHO based failure handling. This is because the UE may spend some time (e.g., time duration of timer T316 for performing the fast MCG recovery) and, due to the spent time, the stored CHO configuration and/or the stored conditional mobility command may become invalid. From the network point of view, the CHO configuration may be decided to be de-configured due to network operation issue (e.g., target cell or source cell may want to release the CHO because the UE doesn't move to the target cell for a long time). However, the UE cannot know that the CHO configuration becomes invalid. Thus, the UE may frequently try to access to the CHO cell using the invalid CHO configuration if the UE performs the CHO based failure handling upon failure of the fast MCF recovery then it cause the RRC re-establishment finally.

The objective of the CHO based failure handling and the fast MCG recovery may be to improve mobility robustness, rather than to improve data interruption time. Therefore, the UE may not need multiple failure handling procedures for the mobility robustness.

In the present disclosure, the UE may detect a radio link failure on the primary cell group (i.e., MCG) then, the UE may check whether the fast MCG recovery and the CHO based failure handling are available (i.e., whether the network may have already allowed to perform the fast MCG recovery and/or the CHO based failure handling via each indication).

If the UE can perform both of the fast MCG recovery and the CHO based failure handling, the UE may perform the fast MCG recovery procedure but doesn't perform the CHO based failure handling procedure by removing information of the CHO based failure handling.

Figure 11:
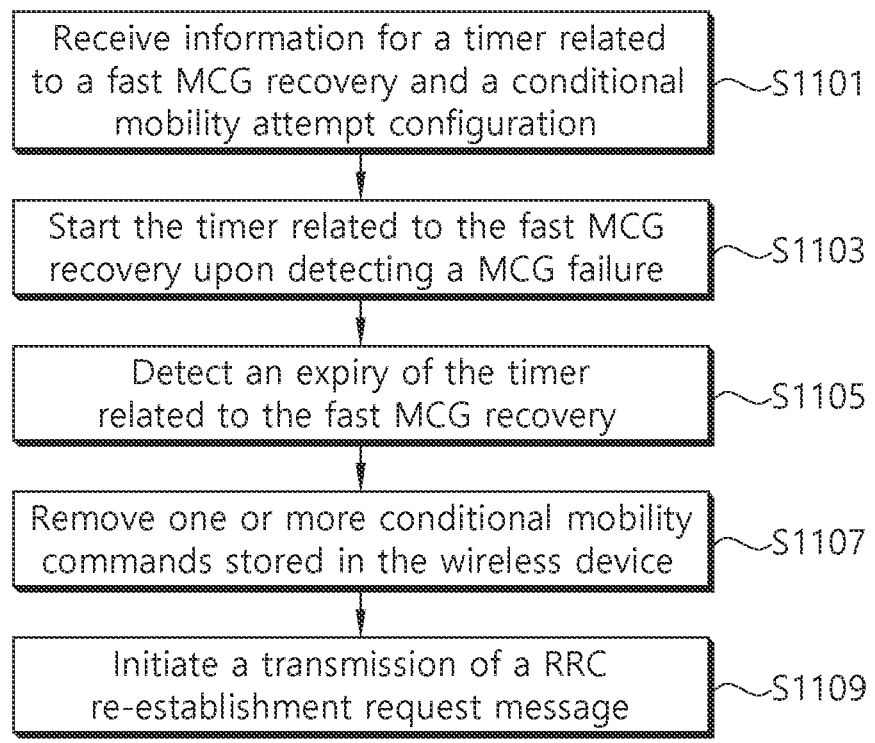
FIG. 11 shows an example of a method for conditional mobility handing when fast MCG recovery is configured according to an embodiment of the present disclosure.

FIG. 11 shows an example of a method for conditional mobility handing when fast MCG recovery is configured according to an embodiment of the present disclosure. Steps illustrated in FIG. 11 may be performed by a wireless device and/or a UE.

Referring to FIG. 11, in step S1101, the wireless device may receive information for a timer related to a fast MCG recovery (i.e., timer T316) and a conditional mobility attempt configuration (i.e., attemptCHO or attemptCondReconfig). That is, the timer T316 and the conditional mobility attempt configuration may be configured for the wireless device. The conditional mobility attempt configuration may comprise an indication to perform a conditional mobility failure handling (i.e., indication to perform a conditional mobility to a candidate cell selected in a RRC connection re-establishment procedure if/when the selected candidate cell is related to one of conditional mobility command(s) stored in the wireless device). An example of the conditional mobility failure handling may comprise CHO failure handling.

In step S1103, the wireless device may start the timer related to the fast MCG recovery upon detecting a MCG failure. For example, the wireless device may initiate a fast MCG recovery procedure and start the timer T316 upon detecting the MCG failure.

In step S1105, the wireless device may detect an expiry of the timer related to the fast MCG recovery. That is, the wireless device may detect a failure of the fast MCG recovery procedure.

In step S1107, the wireless device may remove one or more conditional mobility commands stored in the wireless device. Even though the conditional mobility attempt configuration is configured for the wireless device, the wireless device may remove the one or more conditional mobility commands rather than performing the conditional mobility failure handling.

In step S1109, the wireless device may initiate a transmission of a RRC re-establishment request message. That is, based on detecting an expiry of the timer related to the fast MCG recovery, the wireless device may i) remove one or more conditional mobility commands stored in the wireless device, and ii) initiate a transmission of the RRC re-establishment request message.

According to various embodiments, the wireless device may transmit an MCG failure information message to report the MCG failure via SCG during the fast MCG recovery procedure. The timer T316 may keep running during the fast MCG recovery procedure.

According to various embodiments, the fast MCG recovery procedure may fail if/when the timer T316 is not stopped and expires.

According to various embodiments, the timer T316 may be stopped upon: i) the wireless device receiving an RRC reconfiguration message comprising a reconfiguration with sync for a PCell in an MCG in response to the MCG failure information message; ii) the wireless device receiving a mobility from NR command message in response to the MCG failure information message; ii) the wireless device receiving a RRC release message; or iv) the wireless device initiating a RRC connection re-establishment procedure.

According to various embodiments, the wireless device may initiate an RRC connection re-establishment procedure upon the expiry of the timer related to the fast MCG recovery (e.g., timer T316). The wireless device may perform a cell selection to select a candidate cell in the RRC connection re-establishment procedure. The wireless device may remove the one or more conditional mobility commands stored in the wireless device based on that the cell selection is triggered in the RRC connection re-establishment procedure that is initiated upon the expiry of the timer related to the fast MCG recovery.

According to various embodiments, the wireless device may remove the one or more conditional mobility commands stored in the wireless device in a state the conditional mobility attempt configuration is configured for the wireless device.

According to various embodiments, the selected candidate cell may not be related to a conditional mobility command among the one or more conditional mobility commands.

According to various embodiments, the selected candidate cell may be related to a conditional mobility command among the one or more conditional mobility commands. The wireless device may remove the one or more conditional mobility commands stored in the wireless device without performing a conditional mobility to the selected candidate cell in a state the conditional mobility attempt configuration is configured for the wireless device.

According to various embodiments, after detecting the expiry of the timer related to the fast MCG recovery, the wireless device may skip a conditional mobility failure handling in a state the conditional mobility attempt configuration is configured for the wireless device.

According to various embodiments, the one or more conditional mobility commands stored in the wireless device may be removed to skip the conditional mobility failure handling.

According to various embodiments, the wireless device may receive a RRC re-establishment message in response to the RRC re-establishment request message. The wireless device may transmit a RRC re-establishment complete message in response to the RRC re-establishment message.

According to various embodiments, the wireless device may declare radio link failure on a first cell group while connecting on a second cell group. The wireless device may check whether attempting CHO is available upon declaration of the radio link failure. The wireless device may remove information associated with the attempting CHO if available. The wireless device may send a message to the second cell group to recover the radio link of the first cell group.

Figure 12:
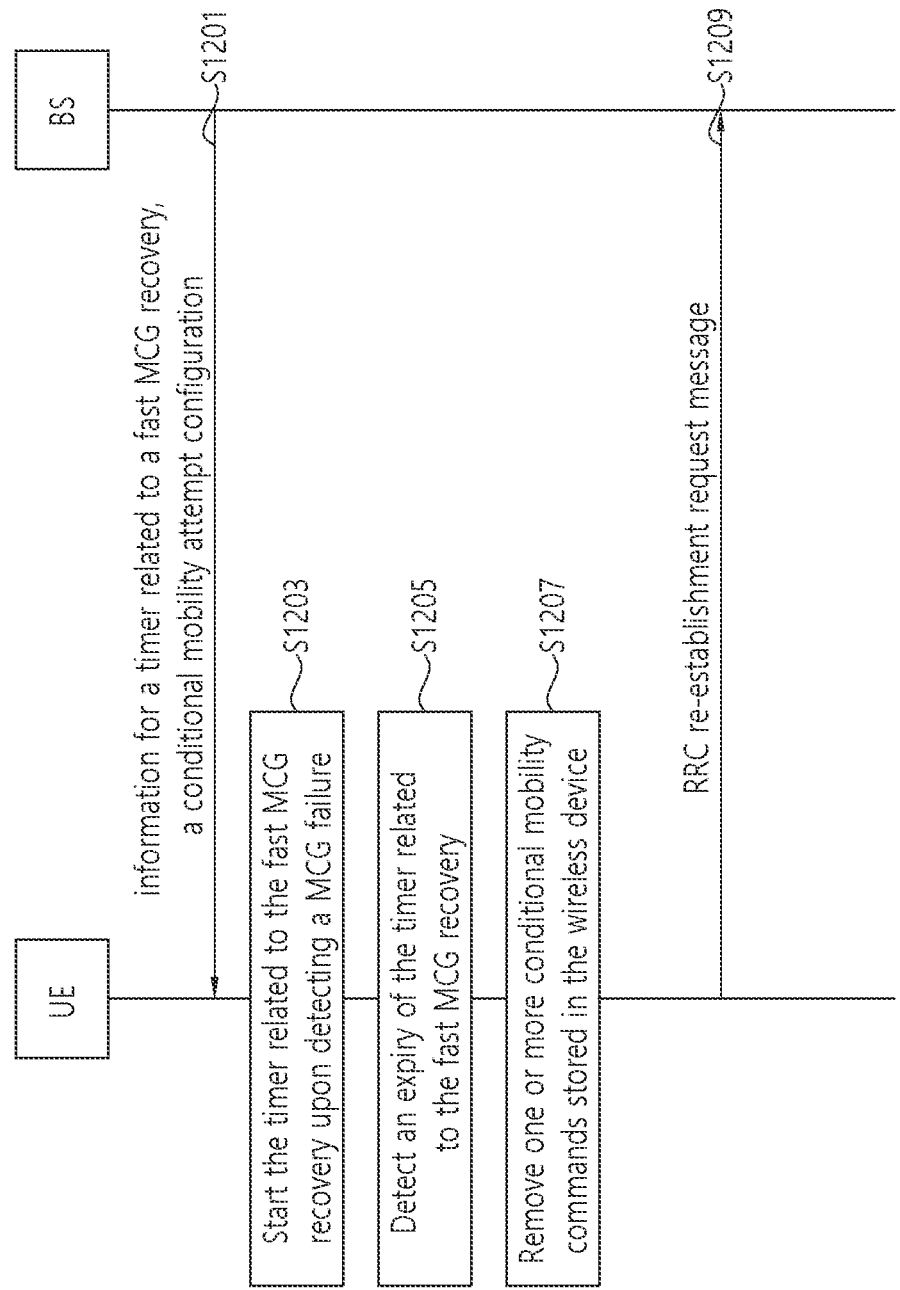
FIG. 12 shows an example of a signal flow for conditional mobility handing when fast MCG recovery is configured according to an embodiment of the present disclosure.

FIG. 12 shows an example of a signal flow for conditional mobility handing when fast MCG recovery is configured according to an embodiment of the present disclosure. The signal flow may be associated with a UE (Or, wireless device) and a base station (BS).

Referring to FIG. 12, in step S1201, the BS may transmit, to the wireless device, information for a timer related to a fast MCG recovery (i.e., timer T316) and a conditional mobility attempt configuration (i.e., attemptCHO or attemptCondReconfig).

In step S1203, the wireless device may start the timer related to the fast MCG recovery upon detecting a MCG failure.

In step S1205, the wireless device may detect an expiry of the timer related to the fast MCG recovery.

In step S1207, the wireless device may remove one or more conditional mobility commands stored in the wireless device.

In step S1209, the BS may receive, from the wireless device, a RRC re-establishment request message. That is, based on detecting an expiry of the timer related to the fast MCG recovery, the wireless device may i) remove one or more conditional mobility commands stored in the wireless device, and ii) initiate a transmission of the RRC re-establishment request message.

The BS in FIG. 12 may be an example of a second device 220 in FIG. 2, and therefore, steps of the BS as illustrated in FIG. 12 may be implemented by the second device 220. For example, the processor 221 may be configured to control the transceiver 223 to transmit, to the wireless device, information for a timer related to a fast MCG recovery (i.e., timer T316) and a conditional mobility attempt configuration (i.e., attemptCHO or attemptCondReconfig). The wireless device may start the timer related to the fast MCG recovery upon detecting a MCG failure. The wireless device may detect an expiry of the timer related to the fast MCG recovery. The wireless device may remove one or more conditional mobility commands stored in the wireless device. The processor 221 may be configured to control the transceiver 223 to receive, from the wireless device, a RRC re-establishment request message. That is, based on detecting an expiry of the timer related to the fast MCG recovery, the wireless device may i) remove one or more conditional mobility commands stored in the wireless device, and ii) initiate a transmission of the RRC re-establishment request message.

Figure 13:
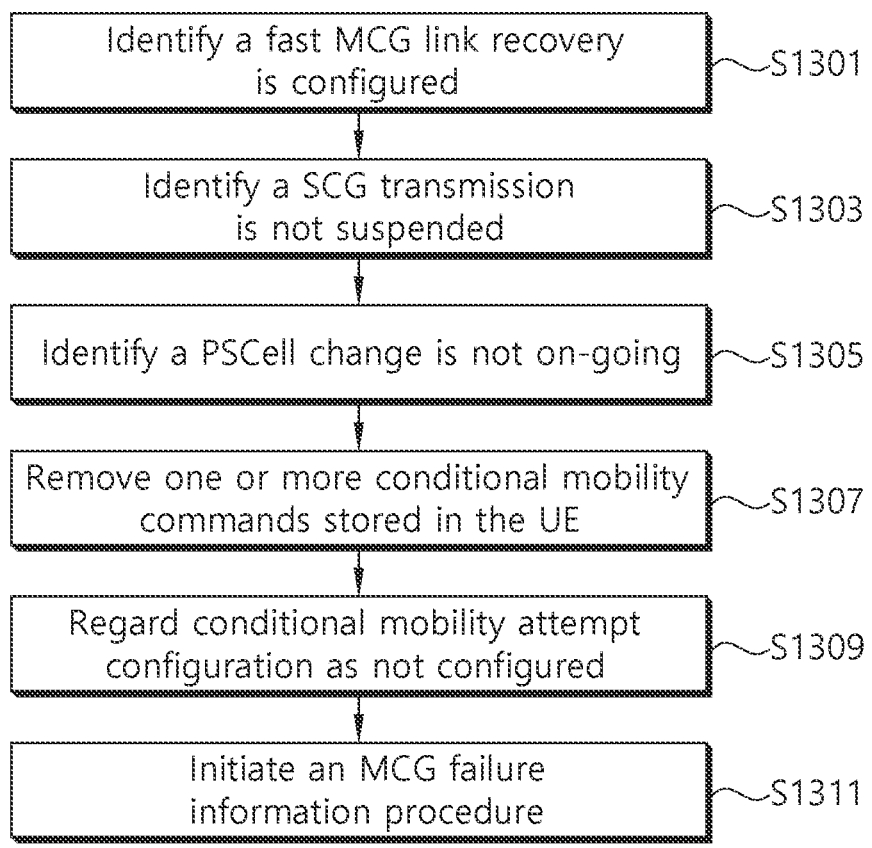
FIG. 13 shows an example of a method for removing information related to conditional mobility failure handling before performing a fast MCG recovery procedure according to an embodiment of the present disclosure.

FIG. 13 shows an example of a method for removing information related to conditional mobility failure handling before performing a fast MCG recovery procedure according to an embodiment of the present disclosure. Steps illustrated in FIG. 13 may be performed by a UE and/or a wireless device.

Referring to FIG. 13, in step S1301, the UE may identify a fast MCG link recovery is configured. That is, the UE may identify timer T316 is configured.

In step S1303, the UE may identify SCG transmission is not suspended.

In step S1305, the UE may identify PSCell change is not on-going. For example, the UE may identify timer T304 for the NR PSCell is not running in case of NR-DC or timer T307 of the E-UTRA PSCell is not running, in NE-DC In step S1307, the UE may remove one or more conditional mobility commands stored in the UE.

In step S1309, the UE may regard conditional mobility attempt configuration as not configured, if the conditional mobility attempt configuration is configured.

In step S1311, the UE may initiate an MCG failure information procedure, to report MCG radio link failure.

More specifically, the UE shall:
1> upon T310 expiry in PCell; or
1> upon random access problem indication from MCG MAC while neither T300, T301, T304, T311 nor T319 are running; or
1> upon indication from MCG RLC that the maximum number of retransmissions has been reached:
2> if the indication is from MCG RLC and CA duplication is configured and activated, and for the corresponding logical channel allowedServingCells only includes SCell(s):
3> initiate the failure information procedure to report RLC failure.
2> else:
3> consider radio link failure to be detected for the MCG i.e. RLF;
3> if AS security has not been activated:
4> perform the actions upon going to RRC_IDLE with release cause 'other';
3> else if AS security has been activated but SRB2 and at least one DRB have not been setup:
4> perform the actions upon going to RRC_IDLE with release cause 'RRC connection failure';
3> else:
4> if fast MCG link recovery is configured (i.e. T316 is configured); and
4> if SCG transmission is not suspended; and
4> if PSCell change is not ongoing (i.e. timer T304 for the NR PSCell is not running in case of NR-DC or timer T307 of the E-UTRA PSCell is not running, in NE-DC):
5> remove all the entries within VarCHO-Config, if any; OR
5> regards attemptCHO as not configured if configured;
5> initiate the MCG failure information procedure to report MCG radio link failure.
4> else:
5> initiate the connection re-establishment procedure.

Figure 14:
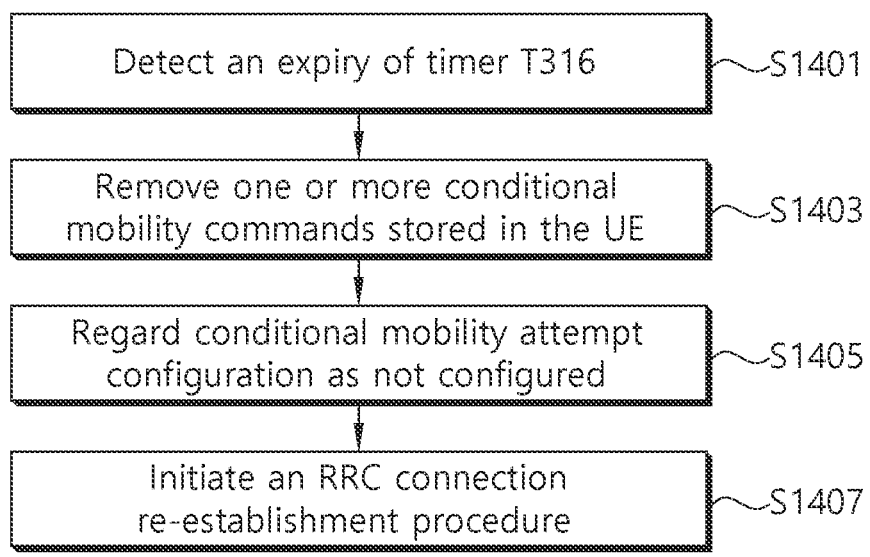
FIG. 14 shows an example of a method for removing information related to conditional mobility failure handling after a failure of the fast MCG recovery according to an embodiment of the present disclosure.

FIG. 14 shows an example of a method for removing information related to conditional mobility failure handling after a failure of the fast MCG recovery according to an embodiment of the present disclosure. Steps illustrated in FIG. 14 may be performed by a UE and/or a wireless device.

Referring to FIG. 14, in step S1401, the UE may detect an expiry of timer T316. That is, the UE may detect a failure of a fast MCG recovery procedure.

In step S1403, the UE may remove one or more conditional mobility commands stored in the UE.

In step S1405, the UE may regard conditional mobility attempt configuration as not configured.

In step S1407, the UE may initiate an RRC connection re-establishment procedure.

More specifically, the UE shall:
1> if T316 expires:
2> remove all the entries within VarCHO-Config, if any; OR 2> regards attemptCHO as not configured if configured;
2> initiate the connection re-establishment procedure.

Figure 15:
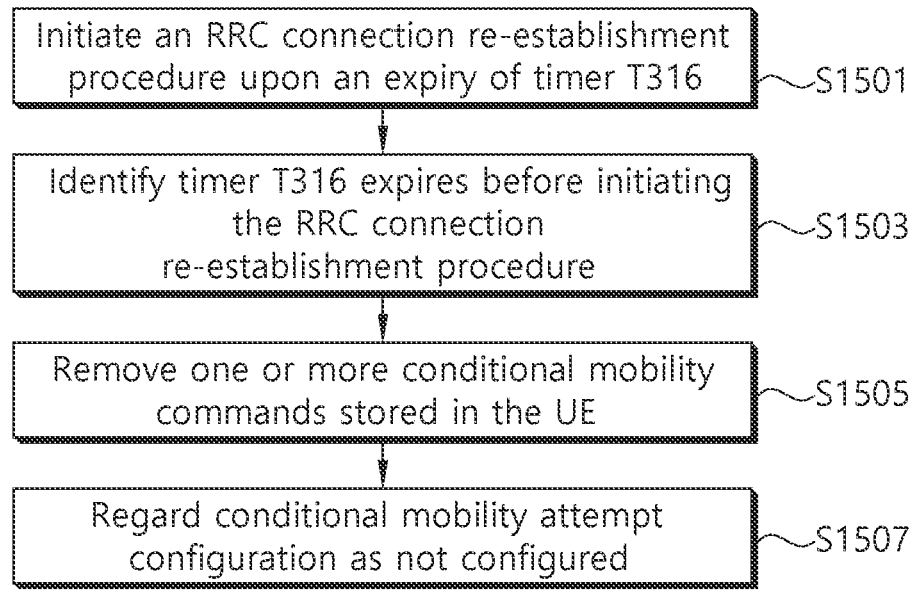
FIG. 15 shows an example of a method for removing information related to conditional mobility failure handling in an RRC connection re-establishment procedure according to an embodiment of the present disclosure.

FIG. 15 shows an example of a method for removing information related to conditional mobility failure handling in an RRC connection re-establishment procedure according to an embodiment of the present disclosure. Steps illustrated in FIG. 15 may be performed by a UE and/or a wireless device.

Referring to FIG. 15, in step S1501, the wireless device may initiate an RRC connection re-establishment procedure upon an expiry of timer T316 (i.e., upon detecting a failure of the fast MCG recovery procedure).

In step S1503, the wireless device may identify that the timer T316 expires before initiating the RRC connection re-establishment procedure.

In step S1505, the wireless device may remove one or more conditional mobility commands stored in the UE.

In step S1507, the wireless device may regard conditional mobility attempt configuration as not configured.

More specifically, the UE may initiate the RRC connection re-establishment procedure when one of the following conditions is met:
1> upon detecting radio link failure of the MCG and fast MCG link recovery is not available (i.e. T316 is not configured); or
1> upon re-configuration with sync failure of the MCG; or
1> upon mobility from NR failure; or
1> upon integrity check failure indication from lower layers concerning SRB1 or SRB2, except if the integrity check failure is detected on the RRCReestablishment message; or
1> upon an RRC connection reconfiguration failure; or
1> upon detecting radio link failure for the SCG while MCG transmission is suspended in NR-DC or in NE-DC; or
1> upon reconfiguration with sync failure of the SCG while MCG transmission is suspended; or
1> upon SCG change failure while MCG transmission in NE-DC; or
1> upon SCG configuration failure while MCG transmission is suspended in NR-DC or in NE-DC; or
1> upon integrity check failure indication from SCG lower layers concerning SRB3 while MCG is suspended; or
1> upon T316 expiry.

Upon initiation of the RRC connection re-establishment procedure, the UE shall:
1> stop timer T310, if running;
1> stop timer T304, if running;
1> start timer T311;
1> stop timer T316, if running;
1> suspend all RBs, except SRB0;
1> reset MAC;
1> release the MCG SCell(s), if configured;
1> release spCellConfig, if configured;
1> if T316 expires before initiating this procedure:
2> remove all the entries within VarCHO-Config, if any; OR
2> regards attemptCHO as not configured if configured;
1> if MR-DC is configured:
2> perform MR-DC release;
1> release delayBudgetReportingConfig, if configured, and stop timer T342, if running;
1> release overheatingAssistanceConfig, if configured, and stop timer T345, if running;
1> perform cell selection in accordance with the cell selection process.

According to various embodiments, upon selecting a suitable NR cell, the UE shall:
1> ensure having valid and up to date essential system information;
1> stop timer T311;
1> if T390 is running:
2> stop timer T390 for all access categories;
2> perform unified access control related to T302, T390 expiry or stop (barring alleviation);
1> if the cell selection is triggered by detecting radio link failure of the MCG or re-configuration with sync failure of the MCG, and
1> if attemptCondReconfig is configured; and
1> if the selected cell is one of the candidate cells for which the reconfigurationWithSync is included in the masterCellGroup in VarConditionalReconfig:
2> apply the stored condRRCReconfig associated to the selected cell;
1> else:
2> if UE is configured with conditionalReconfiguration:
3> reset MAC;
3> release spCellConfig, if configured;
3> release the MCG SCell(s), if configured;
3> release delayBudgetReportingConfig, if configured and stop timer T342, if running;
3> release overheatingAssistanceConfig, if configured and stop timer T345, if running;
3> if MR-DC is configured:
4> perform MR-DC release;
3> release idc-AssistanceConfig, if configured;
3> release btNameList, if configured;
3> release wlanNameList, if configured;
3> release sensorNameList, if configured;
3> release drx-PreferenceConfig for the MCG, if configured and stop timer T346a associated with the MCG, if running;
3> release maxBW-PreferenceConfig for the MCG, if configured and stop timer T346b associated with the MCG, if running;
3> release maxCC-PreferenceConfig for the MCG, if configured and stop timer T346c associated with the MCG, if running;
3> release maxMIMO-LayerPreferenceConfig for the MCG, if configured and stop timer T346d associated with the MCG, if running;
3> release minSchedulingOffsetPreferenceConfig for the MCG, if configured and stop timer T346e associated with the MCG, if running;
3> release releasePreferenceConfig, if configured and stop timer T346f, if running;
3> release onDemandSIB-Request if configured, and stop timer T350, if running;
3> suspend all RBs, except SRB0;
2> remove all the entries within VarConditionalReconfig, if any;
2> for each measId, if the associated reportConfig has a reportType set to condTriggerConfig:
3> or the associated reportConfigId:
4> remove the entry with the matching reportConfigId from the reportConfigList within the VarMeasConfig;
3> if the associated measObjectId is only associated to a reportConfig with reportType set to condTriggerConfig:
4> remove the entry with the matching measObjectId from the measObjectList within the VarMeasConfig;
3> remove the entry with the matching measId from the measIdList within the VarMeasConfig;

2> start timer T301;
2> apply the default L1 parameter values as specified in corresponding physical layer specifications except for the parameters for which values are provided in SIB1;
2> apply the default MAC Cell Group configuration;
2> apply the CCCH configuration;
2> apply the timeAlignmentTimerCommon included in SIB1;
2> initiate transmission of the RRCReestablishmentRequest message;

The procedure may apply also if the UE returns to the source PCell.

Upon selecting an inter-RAT cell, the UE shall:
1> perform the actions upon going to RRC_IDLE, with release cause 'RRC connection failure'.

Figure 16:
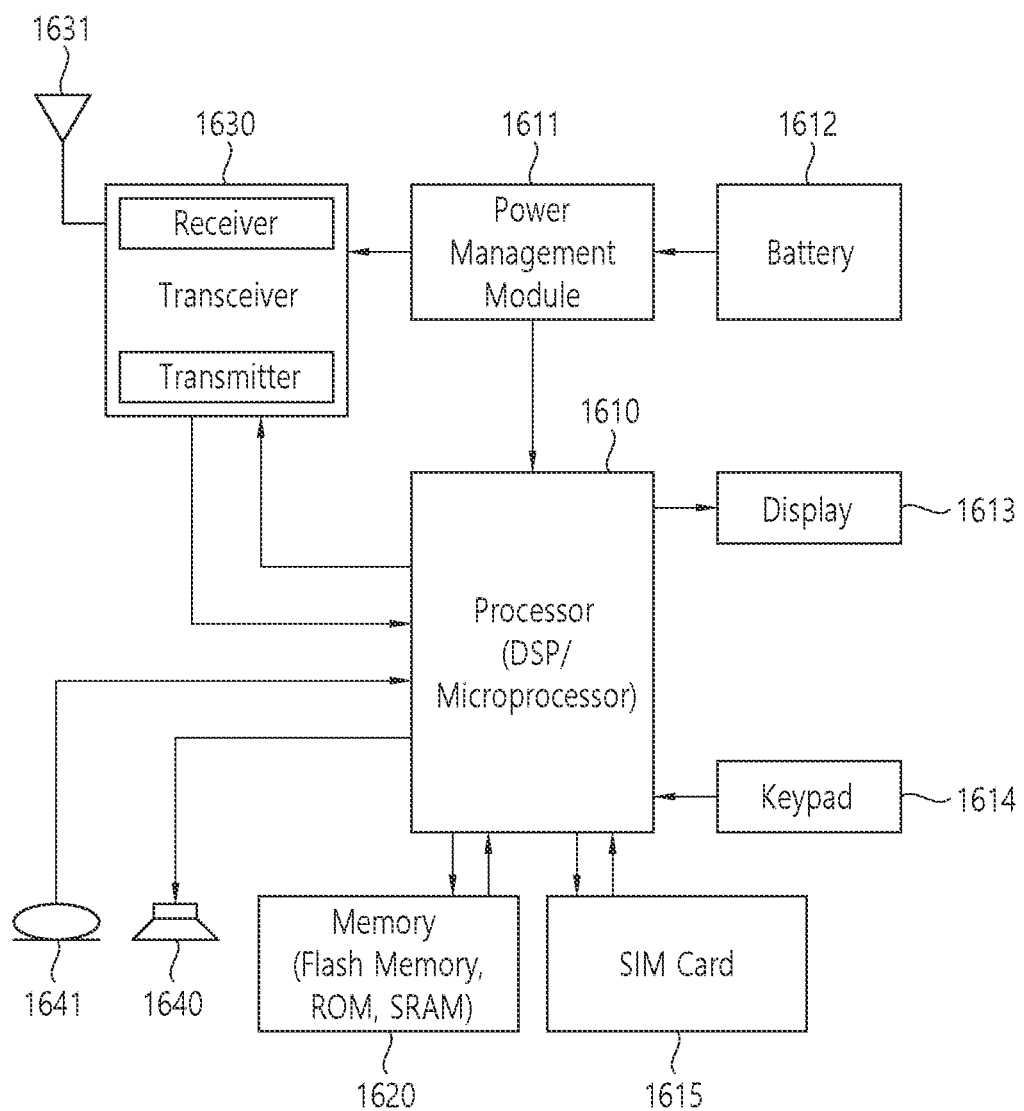
FIG. 16 shows a UE to implement an embodiment of the present disclosure.

FIG. 16 shows a UE to implement an embodiment of the present disclosure. The present disclosure described above for UE side may be applied to this embodiment. The UE in FIG. 16 may be an example of first device 216 as illustrated in FIG. 2.

A UE includes a processor 1610 (i.e., processor 211), a power management module 1611, a battery 1612, a display 1613, a keypad 1614, a subscriber identification module (SIM) card 1615, a memory 1620 (i.e., memory 212), a transceiver 1630 (i.e., transceiver 213), one or more antennas 1631, a speaker 1640, and a microphone 1641.

The processor 1610 may be configured to implement proposed functions, procedures and/or methods described in this description. Layers of the radio interface protocol may be implemented in the processor 1610. The processor 1610 may include application-specific integrated circuit (ASIC), other chipset, logic circuit and/or data processing device. The processor 1610 may be an application processor (AP). The processor 1610 may include at least one of a digital signal processor (DSP), a central processing unit (CPU), a graphics processing unit (GPU), a modem (modulator and demodulator). An example of the processor 1610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1610 may be configured to, or configured to control the transceiver 1630 to implement steps performed by the UE and/or the wireless device throughout the disclosure.

The power management module 1611 manages power for the processor 1610 and/or the transceiver 1630. The battery 1612 supplies power to the power management module 1611. The display 1613 outputs results processed by the processor 1610. The keypad 1614 receives inputs to be used by the processor 1610. The keypad 1614 may be shown on the display 1613. The SIM card 1615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1620 is operatively coupled with the processor 1610 and stores a variety of information to operate the processor 1610. The memory 1620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1620 and executed by the processor 1610. The memory 1620 can be implemented within the processor 1610 or external to the processor 1610 in which case those can be communicatively coupled to the processor 1610 via various means as is known in the art.

The transceiver 1630 is operatively coupled with the processor 1610, and transmits and/or receives a radio signal. The transceiver 1630 includes a transmitter and a receiver. The transceiver 1630 may include baseband circuitry to process radio frequency signals. The transceiver 1630 controls the one or more antennas 1631 to transmit and/or receive a radio signal.

The speaker 1640 outputs sound-related results processed by the processor 1610. The microphone 1641 receives sound-related inputs to be used by the processor 1610.

According to various embodiments, the processor 1610 may be configured to, or configured to control the transceiver 1630 to implement steps performed by the UE and/or the wireless device throughout the disclosure.

For example, the processor 1610 may be configured to control the transceiver 1630 to receive information for a timer related to a fast MCG recovery (i.e., timer T316) and a conditional mobility attempt configuration (i.e., attemptCHO or attemptCondReconfig). That is, the timer T316 and the conditional mobility attempt configuration may be configured for the wireless device. The conditional mobility attempt configuration may comprise an indication to perform a conditional mobility failure handling (i.e., indication to perform a conditional mobility to a candidate cell selected in a RRC connection re-establishment procedure if/when the selected candidate cell is related to one of conditional mobility command(s) stored in the wireless device). An example of the conditional mobility failure handling may comprise CHO failure handling.

The processor 1610 may be configured to start the timer related to the fast MCG recovery upon detecting a MCG failure. For example, the wireless device may initiate a fast MCG recovery procedure and start the timer T316 upon detecting the MCG failure.

The processor 1610 may be configured to detect an expiry of the timer related to the fast MCG recovery. That is, the wireless device may detect a failure of the fast MCG recovery procedure.

The processor 1610 may be configured to remove one or more conditional mobility commands stored in the wireless device. Even though the conditional mobility attempt configuration is configured for the wireless device, the wireless device may remove the one or more conditional mobility commands rather than performing the conditional mobility failure handling.

The processor 1610 may be configured to initiate a transmission of a RRC re-establishment request message. That is, based on detecting an expiry of the timer related to the fast MCG recovery, the wireless device may i) remove one or more conditional mobility commands stored in the wireless device, and ii) initiate a transmission of the RRC re-establishment request message.

According to various embodiments, the processor 1610 may be configured to control the transceiver 1630 to transmit an MCG failure information message to report the MCG failure via SCG during the fast MCG recovery procedure. The timer T316 may keep running during the fast MCG recovery procedure.

According to various embodiments, the fast MCG recovery procedure may fail if/when the timer T316 is not stopped and expires.

According to various embodiments, the timer T316 may be stopped upon: i) the wireless device receiving an RRC reconfiguration message comprising a reconfiguration with sync for a PCell in an MCG in response to the MCG failure information message; ii) the wireless device receiving a mobility from NR command message in response to the MCG failure information message; ii) the wireless device receiving a RRC release message; or iv) the wireless device initiating a RRC connection re-establishment procedure.

According to various embodiments, the processor 1610 may be configured to initiate an RRC connection re-establishment procedure upon the expiry of the timer related to the fast MCG recovery (e.g., timer T316). The processor 1610 may be configured to perform a cell selection to select a candidate cell in the RRC connection re-establishment procedure. The processor 1610 may be configured to remove the one or more conditional mobility commands stored in the wireless device based on that the cell selection is triggered in the RRC connection re-establishment procedure that is initiated upon the expiry of the timer related to the fast MCG recovery.

According to various embodiments, the processor 1610 may be configured to remove the one or more conditional mobility commands stored in the wireless device in a state the conditional mobility attempt configuration is configured for the wireless device.

According to various embodiments, the selected candidate cell may not be related to a conditional mobility command among the one or more conditional mobility commands.

According to various embodiments, the selected candidate cell may be related to a conditional mobility command among the one or more conditional mobility commands. The processor 1610 may be configured to remove the one or more conditional mobility commands stored in the wireless device without performing a conditional mobility to the selected candidate cell in a state the conditional mobility attempt configuration is configured for the wireless device.

According to various embodiments, after detecting the expiry of the timer related to the fast MCG recovery, the processor 1610 may be configured to skip a conditional mobility failure handling in a state the conditional mobility attempt configuration is configured for the wireless device.

According to various embodiments, the one or more conditional mobility commands stored in the wireless device may be removed to skip the conditional mobility failure handling.

According to various embodiments, the processor 1610 may be configured to control the transceiver 1630 to receive a RRC re-establishment message in response to the RRC re-establishment request message. The processor 1610 may be configured to control the transceiver 1630 to transmit a RRC re-establishment complete message in response to the RRC re-establishment message.

Figure 17:
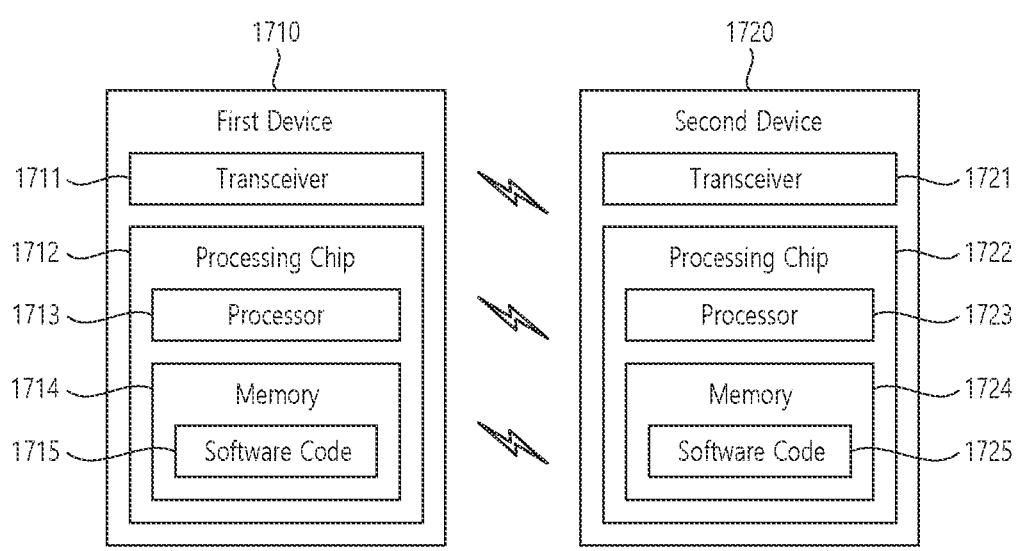
FIG. 17 shows another example of a wireless communication system to which the technical features of the present disclosure can be applied.

FIG. 17 shows another example of a wireless communication system to which the technical features of the present disclosure can be applied.

Referring to FIG. 17, the wireless communication system may include a first device 1710 (i.e., first device 210) and a second device 1720 (i.e., second device 220).

The first device 1710 may include at least one transceiver, such as a transceiver 1711, and at least one processing chip, such as a processing chip 1712. The processing chip 1712 may include at least one processor, such a processor 1713, and at least one memory, such as a memory 1714. The memory may be operably connectable to the processor 1713. The memory 1714 may store various types of information and/or instructions. The memory 1714 may store a software code 1715 which implements instructions that, when executed by the processor 1713, perform operations of the first device 910 described throughout the disclosure. For example, the software code 1715 may implement instructions that, when executed by the processor 1713, perform the functions, procedures, and/or methods of the first device 1710 described throughout the disclosure. For example, the software code 1715 may control the processor 1713 to perform one or more protocols. For example, the software code 1715 may control the processor 1713 to perform one or more layers of the radio interface protocol.

The second device 1720 may include at least one transceiver, such as a transceiver 1721, and at least one processing chip, such as a processing chip 1722. The processing chip 1722 may include at least one processor, such a processor 1723, and at least one memory, such as a memory 1724. The memory may be operably connectable to the processor 1723. The memory 1724 may store various types of information and/or instructions. The memory 1724 may store a software code 1725 which implements instructions that, when executed by the processor 1723, perform operations of the second device 1720 described throughout the disclosure. For example, the software code 1725 may implement instructions that, when executed by the processor 1723, perform the functions, procedures, and/or methods of the second device 1720 described throughout the disclosure. For example, the software code 1725 may control the processor 1723 to perform one or more protocols. For example, the software code 1725 may control the processor 1723 to perform one or more layers of the radio interface protocol.

According to various embodiments, the first device 1710 as illustrated in FIG. 17 may comprise a wireless device. The wireless device may comprise a transceiver 1711, a processing chip 1712. The processing chip 1712 may comprise a processor 1713, and a memory 1714. The memory 1714 may be operably connectable to the processor 1713. The memory 1714 may store various types of information and/or instructions. The memory 1714 may store a software code 1715 which implements instructions that, when executed by the processor 1713, perform operations comprising: receiving information for a timer related to a fast master cell group (MCG) recovery and a conditional mobility attempt configuration; starting the timer related to the fast MCG recovery upon detecting a MCG failure; and based on detecting an expiry of the timer related to the fast MCG recovery: removing one or more conditional mobility commands stored in the wireless device; and initiating a transmission of a radio resource control (RRC) re-establishment request message.

According to various embodiments, a computer-readable medium having recorded thereon a program for performing each step of a method on a computer is provided. The method comprises: receiving information for a timer related to a fast master cell group (MCG) recovery and a conditional mobility attempt configuration; starting the timer related to the fast MCG recovery upon detecting a MCG failure; and based on detecting an expiry of the timer related to the fast MCG recovery: removing one or more conditional mobility commands stored in the wireless device; and initiating a transmission of a radio resource control (RRC) re-establishment request message.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 18:
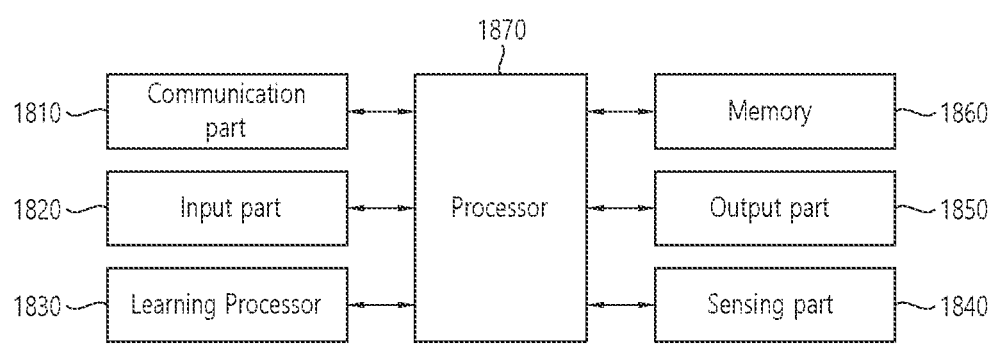
FIG. 18 shows an example of an AI device to which the technical features of the present disclosure can be applied.

FIG. 18 shows an example of an AI device to which the technical features of the present disclosure can be applied.

The AI device 1800 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 18, the AI device 1800 may include a communication part 1810, an input part 1820, a learning processor 1830, a sensing part 1840, an output part 1850, a memory 1860, and a processor 1870.

The communication part 1810 can transmit and/or receive data to and/or from external devices such as the AI devices and the AI server using wire and/or wireless communication technology. For example, the communication part 1810 can transmit and/or receive sensor information, a user input, a learning model, and a control signal with external devices. The communication technology used by the communication part 1810 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1820 can acquire various kinds of data. The input part 1820 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1820 can acquire input data to be used when acquiring an output using learning data and a learning model for model learning. The input part 1820 may obtain raw input data, in which case the processor 1870 or the learning processor 1830 may extract input features by preprocessing the input data.

The learning processor 1830 may learn a model composed of an ANN using learning data. The learned ANN can be referred to as a learning model. The learning model can be used to infer result values for new input data rather than learning data, and the inferred values can be used as a basis for determining which actions to perform. The learning processor 1830 may perform AI processing together with the learning processor of the AI server. The learning processor 1830 may include a memory integrated and/or implemented in the AI device 1800. Alternatively, the learning processor 1830 may be implemented using the memory 1860, an external memory directly coupled to the AI device 1800, and/or a memory maintained in an external device.

The sensing part 1840 may acquire at least one of internal information of the AI device 1800, environment information of the AI device 1800, and/or the user information using various sensors. The sensors included in the sensing part 1840 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1850 may generate an output related to visual, auditory, tactile, etc. The output part 1850 may include a display unit for outputting visual information, a speaker for outputting auditory information, and/or a haptic module for outputting tactile information.

The memory 1860 may store data that supports various functions of the AI device 1800. For example, the memory 1860 may store input data acquired by the input part 1820, learning data, a learning model, a learning history, etc.

The processor 1870 may determine at least one executable operation of the AI device 1800 based on information determined and/or generated using a data analysis algorithm and/or a machine learning algorithm. The processor 1870 may then control the components of the AI device 1800 to perform the determined operation. The processor 1870 may request, retrieve, receive, and/or utilize data in the learning processor 1830 and/or the memory 1860, and may control the components of the AI device 1800 to execute the predicted operation and/or the operation determined to be desirable among the at least one executable operation. The processor 1870 may generate a control signal for controlling the external device, and may transmit the generated control signal to the external device, when the external device needs to be linked to perform the determined operation. The processor 1870 may obtain the intention information for the user input and determine the user's requirements based on the obtained intention information. The processor 1870 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1830 and/or learned by the learning processor of the AI server, and/or learned by their distributed processing. The processor 1870 may collect history information including the operation contents of the AI device 1800 and/or the user's feedback on the operation, etc. The processor 1870 may store the collected history information in the memory 1860 and/or the learning processor 1830, and/or transmit to an external device such as the AI server. The collected history information can be used to update the learning model. The processor 1870 may control at least some of the components of AI device 1800 to drive an application program stored in memory 1860. Furthermore, the processor 1870 may operate two or more of the components included in the AI device 1800 in combination with each other for driving the application program.

Figure 19:
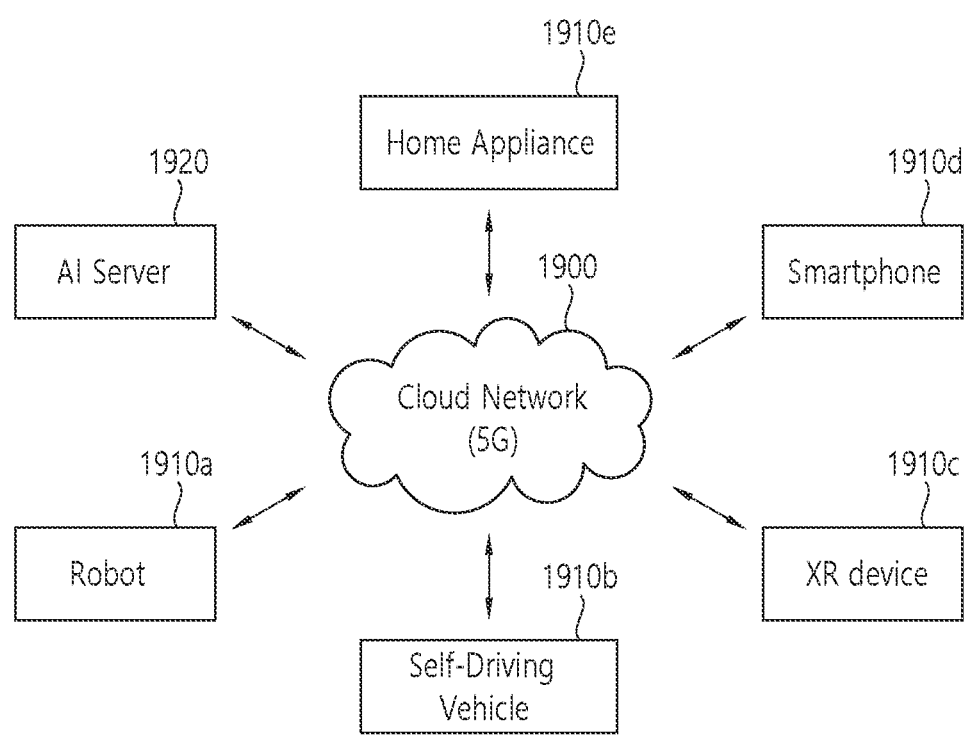
FIG. 19 shows an example of an AI system to which the technical features of the present disclosure can be applied.

FIG. 19 shows an example of an AI system to which the technical features of the present disclosure can be applied.

Referring to FIG. 19, in the AI system, at least one of an AI server 1920, a robot 1910*a*, an autonomous vehicle 1910*b*, an XR device 1910*c*, a smartphone 1910*d* and/or a home appliance 1910*e* is connected to a cloud network 1900. The robot 1910*a*, the autonomous vehicle 1910*b*, the XR device 1910*c*, the smartphone 1910*d*, and/or the home appliance 1910*e* to which the AI technology is applied may be referred to as AI devices 1910*a* to 1910*e*.

The cloud network 1900 may refer to a network that forms part of a cloud computing infrastructure and/or resides in a cloud computing infrastructure. The cloud network 1900 may be configured using a 3G network, a 4G or LTE network, and/or a 5G network. That is, each of the devices 1910*a* to 1910*e* and 1920 consisting the AI system may be connected to each other through the cloud network 1900. In particular, each of the devices 1910*a* to 1910*e* and 1920 may communicate with each other through a base station, but may directly communicate with each other without using a base station.

The AI server 1920 may include a server for performing AI processing and a server for performing operations on big data. The AI server 1920 is connected to at least one or more of AI devices constituting the AI system, i.e. the robot 1910*a*, the autonomous vehicle 1910*b*, the XR device 1910*c*, the smartphone 1910*d* and/or the home appliance 1910*e* through the cloud network 1900, and may assist at least some AI processing of the connected AI devices 1910*a* to 1910*e*. The AI server 1920 can learn the ANN according to the machine learning algorithm on behalf of the AI devices 1910*a* to 1910*e*, and can directly store the learning models and/or transmit them to the AI devices 1910*a* to 1910*e*. The AI server 1920 may receive the input data from the AI devices 1910*a* to 1910*e*, infer the result value with respect to the received input data using the learning model, generate a response and/or a control command based on the inferred result value, and transmit the generated data to the AI devices 1910*a* to 1910*e*. Alternatively, the AI devices 1910*a* to 1910*e* may directly infer a result value for the input data using a learning model, and generate a response and/or a control command based on the inferred result value.

Various embodiments of the AI devices 1910*a* to 1910*e* to which the technical features of the present disclosure can be applied will be described. The AI devices 1910*a* to 1910*e* shown in FIG. 19 can be seen as specific embodiments of the AI device 1800 shown in FIG. 18.

The present disclosure can have various advantageous effects.

For example, unnecessary multiple recovery procedures can be prevented when the UE detects radio link failure. Therefore, the UE may not suffer the potential data interruption problem which may be caused by multiple recovery procedures.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:
   receiving i) information for a timer related to a transmission of a master cell group (MCG) failure information message, ii) a conditional mobility attempt configuration, and iii) configurations of candidate cells for a conditional mobility,
   wherein the conditional mobility attempt configuration is a configuration for performing the conditional mobility based on a cell selected after a failure being a candidate cell for the conditional mobility;
   based on a failure of an MCG being detected, starting the timer, wherein the timer is started i) with transmitting the MCG failure information message and ii) without performing the conditional mobility based on the conditional mobility attempt configuration, and wherein the timer is stopped upon receiving a synchronous reconfiguration for a primary cell (PCell); and upon an expiry of the timer:
removing all the configurations of candidate cells for the conditional mobility; and
initiating a transmission of a radio resource control (RRC) re-establishment request message.

2. The method of claim 1, further comprising:
initiating an RRC connection re-establishment procedure upon the expiry of the timer; and
performing a cell selection to select a candidate cell in the RRC connection re-establishment procedure.

3. The method of claim 2, wherein the selected candidate cell is not related to a configuration of candidate cell among the configurations of candidate cells for the conditional mobility.

4. The method of claim 2, wherein the selected candidate cell is related to a configuration of candidate cell among the configurations of candidate cells for the conditional mobility, and
wherein removing all the configurations of candidate cells for the conditional mobility comprises removing all the configurations of candidate cells for the conditional mobility without performing a conditional mobility to the selected candidate cell in a state the conditional mobility attempt configuration is configured.

5. The method of claim 2, further comprising:
after detecting the expiry of the timer, skipping performing a conditional mobility to the selected candidate cell in a state the conditional mobility attempt configuration is configured.

6. The method of claim 2, wherein all the configurations of candidate cells for the conditional mobility are removed to skip performing a conditional mobility to the selected candidate cell.

7. The method of claim 1,
wherein the MCG failure information message comprises information to report the failure of the MCG, and is transmitted via a secondary cell group (SCG) while the timer is running.

8. The method of claim 1, further comprising:
receiving a RRC re-establishment message in response to the RRC re-establishment request message; and
transmitting a RRC re-establishment complete message in response to the RRC re-establishment message.

9. The method of claim 1, wherein the method is performed by a wireless device in communication with at least one of a user equipment, a network, or autonomous vehicles other than the wireless device.

10. A wireless device comprising:
a transceiver;
a memory; and
at least one processor operatively coupled to the transceiver and the memory,
wherein the memory is configured to store instructions that, based on being executed by the at least one processor, perform operations comprising:
receiving i) information for a timer related to a transmission of a master cell group (MCG) failure information message, ii) a conditional mobility attempt configuration, and iii) configurations of candidate cells for a conditional mobility,
wherein the conditional mobility attempt configuration is a configuration for performing the conditional mobility based on a cell selected after a failure being a candidate cell for the conditional mobility;
based on a failure of an MCG being detected, starting the timer,
wherein the timer is started i) with transmitting the MCG failure information message and ii) without performing the conditional mobility based on the conditional mobility attempt configuration, and
wherein the timer is stopped upon receiving a synchronous reconfiguration for a primary cell (PCell) is received; and
upon an expiry of the timer:
removing all the configurations of candidate cells for the conditional mobility; and
initiating a transmission of a radio resource control (RRC) re-establishment request message.

11. A non-transitory computer-readable medium having recorded thereon a program for performing each step of a method on a computer, the method comprising:
receiving i) information for a timer related to a transmission of a master cell group (MCG) failure information message, ii) a conditional mobility attempt configuration, and iii) configurations of candidate cells for a conditional mobility,
wherein the conditional mobility attempt configuration is a configuration for performing the conditional mobility based on a cell selected after a failure being a candidate cell for the conditional mobility;
based on a failure of an MCG being detected, starting the timer,
wherein the timer is started i) with transmitting the MCG failure information message and ii) without performing the conditional mobility based on the conditional mobility attempt configuration, and
wherein the timer is stopped upon receiving a synchronous reconfiguration for a primary cell (PCell); and
upon an expiry of the timer:
removing all the configurations of candidate cells for the conditional mobility; and
initiating a transmission of a radio resource control (RRC) re-establishment request message.

* * * * *